(12) United States Patent
Quint

(10) Patent No.: US 12,459,498 B2
(45) Date of Patent: Nov. 4, 2025

(54) SYSTEM AND METHOD FOR PROVIDING USEFUL INFORMATION FOLLOWING AN IMPACT EVENT

(71) Applicant: Rivian IP Holdings, LLC, Plymouth, MI (US)

(72) Inventor: Jason Meyer Quint, Ann Arbor, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 371 days.

(21) Appl. No.: 18/077,960

(22) Filed: Dec. 8, 2022

(65) Prior Publication Data
US 2024/0190417 A1    Jun. 13, 2024

(51) Int. Cl.
| | | |
|---|---|---|
| G06F 16/9538 | (2019.01) |
| B60W 30/08 | (2012.01) |
| B60W 50/14 | (2020.01) |
| G06V 20/58 | (2022.01) |
| G07C 5/00 | (2006.01) |

(52) U.S. Cl.
CPC ............ *B60W 30/08* (2013.01); *B60W 50/14* (2013.01); *G06V 20/58* (2022.01); *G07C 5/008* (2013.01); *B60W 2030/082* (2013.01); *B60W 2050/146* (2013.01); *B60W 2420/403* (2013.01)

(58) Field of Classification Search
CPC .............. B60W 30/08; B60W 50/14; B60W 2030/082; B60W 2050/146; B60W 2420/42; G06V 20/58; G07C 5/008
See application file for complete search history.

(56) References Cited

U.S. PATENT DOCUMENTS

| | | |
|---|---|---|
| 10,937,104 B1 | 3/2021 | Fiedler et al. |
| 11,062,595 B1* | 7/2021 | Trim .................... G08G 1/0112 |
| 11,377,111 B1 | 7/2022 | Guziec et al. |
| 11,584,370 B1 | 2/2023 | Nave et al. |
| 2007/0135979 A1* | 6/2007 | Plante .................. G08G 1/0175 |
| | | 701/33.4 |
| 2020/0223385 A1 | 7/2020 | Brozovich et al. |
| 2021/0029385 A1* | 1/2021 | Lee .......................... B62J 50/40 |
| 2021/0136572 A1* | 5/2021 | Ingraham ............ H04W 12/069 |
| 2021/0142590 A1 | 5/2021 | Patel et al. |
| 2022/0055657 A1* | 2/2022 | McIntosh .......... B60W 60/0025 |
| 2022/0089181 A1* | 3/2022 | Gross .................... G07C 5/0841 |

* cited by examiner

*Primary Examiner* — Dalena Tran
(74) *Attorney, Agent, or Firm* — Haley Guiliano LLP

(57) ABSTRACT

Methods and systems are provided to generate instructions and share video content following an impact event. They include detecting an impact event associated with a vehicle and transmitting a request to at least one video recording device within an area of interest from the vehicle. They further include receiving video content captured within a time period around the impact event from at least one video recording device. Methods and systems are also provided to generate useful information following an impact event including detecting an impact event associated with a vehicle and determining one or more contextual parameters associated with the impact event. They further include generating display content based on the one or more contextual parameters and displaying the generated display content on a screen within the vehicle.

20 Claims, 17 Drawing Sheets

SYSTEM AND METHOD FOR PROVIDING USEFUL INFORMATION FOLLOWING AN IMPACT EVENT

INTRODUCTION

The present disclosure is directed to providing instructions and sharing video content following an impact event. More specifically, the present disclosure is directed to sharing captured video content relating to an impact event between vehicles, law enforcement, first responders, user devices and the like following the impact event. The present disclosure is further directed to providing instructions to the users of the vehicle subject to the impact event.

SUMMARY

Vehicles may be subject to impact events. Such events may involve two or more vehicles impacting with each other, or an individual vehicle impacting with another object. When such an impact event involves two or more vehicles, obtaining information about the impact may be difficult. Obtaining this information about the impact event may be important for many reasons, including, for example, for liability, law enforcement, insurance, criminal intent, etc. However, in the absence of a bystander who can corroborate the events surrounding an impact, the parties may have opposing views. Alternatively, when such an impact event involves only one vehicle, depending on the time, location, and severity of such an event, users of the vehicle may benefit by receiving additional information relating to the impact event.

In accordance with some embodiments of the present disclosure, system and methods are provided for using at least one sensor of a vehicle involved in an impact event to send out a request signal to other vehicles and user devices, to obtain video content relating to the impact event. In some embodiments, such a request may be sent out to all vehicles and user devices that may have captured video content around the time and area where the impact event took place.

In some embodiments, the request for video content may be sent out to only a predetermined area around the vehicle. The predetermined area may be a radius surrounding the vehicle involved in the impact event, according to some embodiments. The predetermined area may be determined based on the portion of the vehicle that was involved in the impact event, according to some embodiments.

In some embodiments, the processing circuitry in a vehicle receives a request to share the video content captured by the vehicle. The request may be received from another vehicle or from a governmental agency. In some embodiments, the request may incorporate the time and location where the video content was recorded.

In some embodiments, the processing circuitry in a user device may receive the request to share the video recording captured by the user device. The user device may be a mobile phone, or a camera being used by a user in an area around the location of the impact event, according to an embodiment. The user device may be a security camera mounted on a building surrounding the location of the impact event, according to some embodiments.

In some embodiments, the processing circuitry determined that a vehicle has been in an impact event and generates a display to provide the users of the vehicle with information. The information may be displayed on a screen located within the vehicle, according to some embodiments. The information may be provided to the users of the vehicle using a speaker inside the vehicle.

In some embodiments, systems and methods are provided to generate a context menu and present this menu to the user on a display located inside the vehicle. Based on selections made by the user, the processing circuitry may display information to help the user following an impact event. In some embodiments, the display may inform the user about the best way to exit the vehicle in light of the impact event. The display may depict the damage assessment of the vehicle to allow the user to take appropriate action, according to some embodiments. The context menu may allow the user to contact a third party or first responders and provide them with the location of the vehicle, according to some embodiments. The context menu may allow the user to speak with people outside the vehicle using a microphone inside the vehicle, according to some embodiments.

In some embodiments, the vehicle may communicate with a security system (e.g., a home security system) and may begin recording upon receiving a signal from the security system. The security system may detect an intrusion and may send a request signal to vehicles parked close to the building housing the security system, which may trigger the vehicle's video recording equipment to engage, according to an embodiment. The vehicle may record the area surrounding the building housing the security device and may share it with a user or with law enforcement agencies, according to some embodiments.

In some embodiments, the transmission and receipt of requests for sharing video content may be through direct vehicle-to-vehicle communication. In some embodiments, the transmission and receipt of requests for sharing video content may be through a cloud.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

In some embodiments, the present disclosure is directed to collecting information about an impact event using video content captured around the location at the time of the impact event. By using video content captured by nearby vehicles, users with a recording device, and/or security cameras in surrounding buildings and the like, the present disclosure helps obtain additional details about the impact event which may be useful to law enforcement and/or the parties involved in the impact event. According to some embodiments, vehicles involved in an impact event may have the ability to request video content captured by nearby vehicles and user devices. According to some embodiments, vehicles receiving a request to share video content from another vehicle or from a governmental agency may decide whether to share the video content by using the display located in their vehicle.

In some embodiments, the present disclosure is directed to providing users with helpful information following an impact event. For example, users of vehicles involved in an impact event on the side of a road may be injured and unaware of the condition of the vehicle. In these circumstances, users may not know which door of the vehicle to open to exit the vehicle. By using a contextually displayed menu, users may be able to determine which door in the vehicle is the most appropriate door to use in order to exit the vehicle, according to an embodiment.

In some embodiments, the systems and methods of the present disclosure provides a user interface that allows the user to select a third party or first responders for assistance, following an impact event. Based on the selection, an emergency signal incorporating a request for help may be sent to the third party or first responders or both, according to an embodiment.

Figure 1:
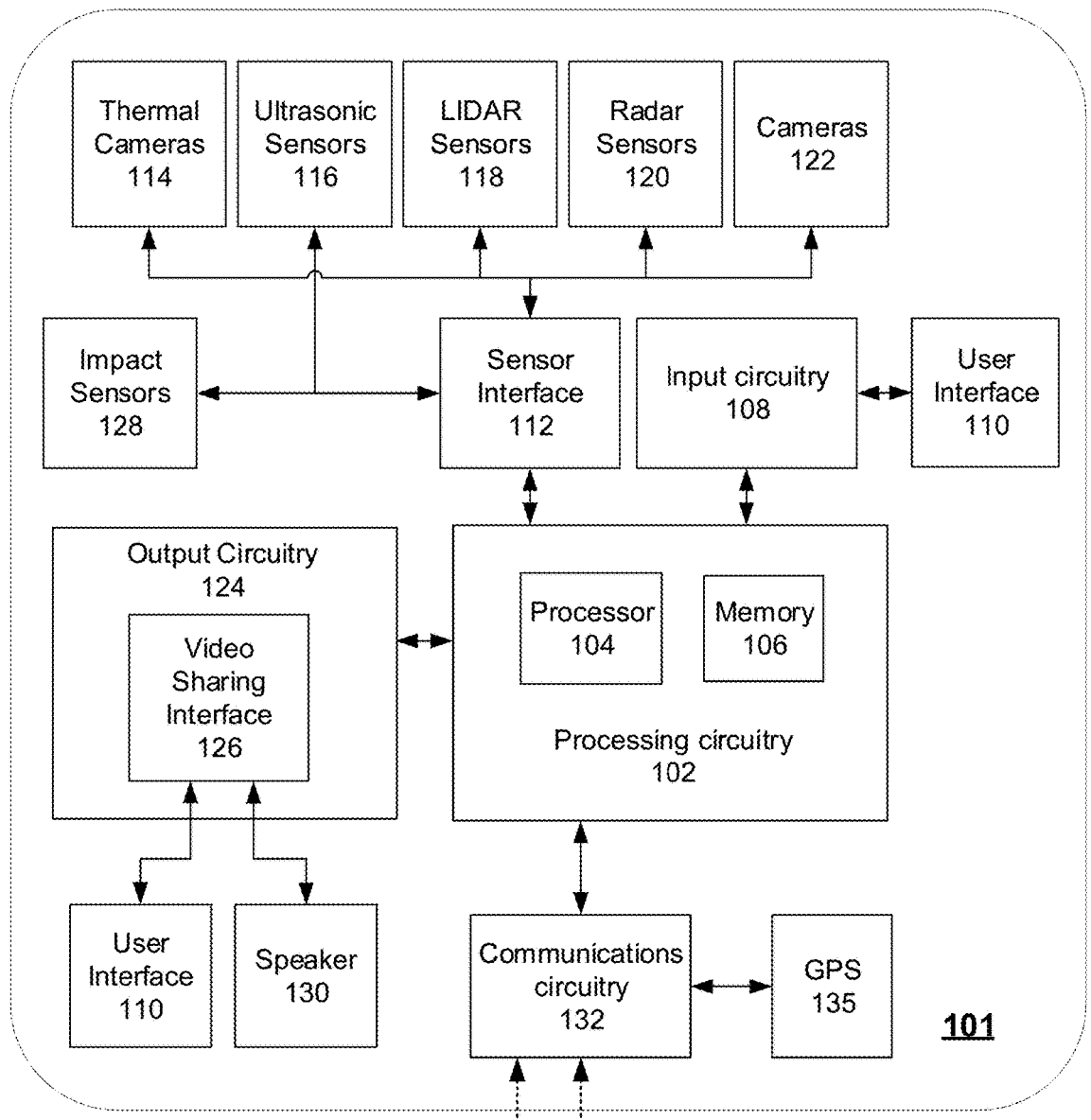
FIG. 1 shows a block diagram of components of a system with processing circuitry for a vehicle to request or respond to requests for sharing video content following an impact event, in accordance with some embodiments of the present disclosure.

FIG. 1 shows a block diagram of components of a system 100 with processing circuitry 102 for a vehicle 101 to request or respond to requests for sharing video content following an impact event, in accordance with some embodiments of the present disclosure. In some implementations, the vehicle 101 may be a car (e.g., a coupe, a sedan, a truck, an SUV, a bus), a motorcycle, an aircraft (e.g., a drone), a watercraft (e.g., a boat), or any other type of vehicle. The vehicle comprises processing circuitry 102, which may comprise a processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. The memory 106 may further store sensor data received via the sensor interface 112 as well as data received from the user interface 110 via the input circuitry 108 and database 140 via the communications circuitry 132. In some embodiments, database 140 is hosted by a server 138 and is communicatively reachable by the communications circuitry 132 by a network 134. Processing circuitry 102 may be communicatively connected to components of vehicle 101 via one or more wires, or via wireless connection. In some embodiments, network 134 is a cloud-based network that is communicatively coupled to communications circuitry 132, server 138, and a user device 138, each coupling formed by a wireless connection. In some embodiments, network 134 is used to communicate with database 140 to receive data or system updates from database 140, as well as enable communication with user device 138. In some embodiments, processing circuitry 102 may notify the user or receive location data from user device 138.

Processing circuitry 102 may be communicatively connected to a sensor interface 112, which may be configured to provide a network bus for a set of sensors used on the vehicle. The set of sensors may include thermal cameras 114, ultrasonic sensors 116, LIDAR sensors 118, radar sensors 120, cameras 122, and impact sensor 128. In some embodiments, to retrieve the sensor data from the set of sensors, the processing circuitry 102 may continuously poll via the sensor interface 112. In alternate embodiments, the set of sensors, including but not limited to the impact sensor 128, may detect an impact event and send an interrupt signal to the processing circuitry 102 to initiate further sensor data retrieval for identification and classification of the impact.

Processing circuitry 102 may further be communicatively connected (e.g., by way of sensor interface 112) to impact sensors 128 (e.g., airbag, bumper, side, etc.). The impact sensors 128 may include an airbag system, e.g., window area sensors, airbag system, and collision sensor. The airbag system includes multiple airbags arranged proximate to one or more window areas or other areas of the vehicle and configured to transmit a signal to processing circuitry in response to the deployment of an airbag. Impact sensor 128 may include gyroscopes, accelerometers, or both. For example, impact sensor 128 may include a MEMS accelerometer capable of detecting the deceleration of a vehicle during a crash and position of the vehicle. Impact sensor 128 may be arranged at various positions in a vehicle. For example, impact sensor 128 may be configured to detect impacts, motion, and deceleration at the front of vehicle, side of vehicle, rear of vehicle, top of vehicle, or a combination thereof (e.g., at the corners of vehicle). In some embodiments, impact sensor 128 includes more than one sensor, each having similar circuitry and capabilities for detecting impact event for vehicle 101. In some embodiments, impact sensor 128 includes more than one sensor, each having different capabilities that are, for example, designed for the particular location of the vehicle. In some embodiments, the sensors are configured to capture video. In some embodiments, the level of damage may be determined based on the damage occurring at a particular location on the vehicle. For example, the vehicle may be involved in a small bumper-to-bumper accident, and the location sensors for the bumper may indicate the level of damage as low based on a signal from a sensor. In some embodiments, impact sensor 128 includes a seat sensor configured to detect whether a person is sitting in a particular seat.

Impact sensor 128 may be in communication with processing circuitry 102. In some embodiments, the processing circuitry is configured to analyze data from impact sensor 128 and send one or more signals to activate one or more airbags of airbag system. Based on information from impact sensor 128, processing circuitry 102 may determine an impact event type (e.g., a side, a front, a rear, a corner or a rollover collision or a flooding event) and vehicle occupancy (e.g., driver, and passengers, if any) and initiate deployment of a suitable airbag of airbag system for the crash type. Based on information from impact sensor 128, processing circuitry 102 may determine which camera captured images or video of the crash for uploading to insurance claims to streamline the processing. Vehicle pressure data may be generated from the sensor inside the vehicle. Airbag deployment data may be generated from the airbag system.

A level of damage to the vehicle may be determined based on the vehicle pressure data, airbag deployment data and vehicle impact data. For example, based on the severity of an impact event, one or more airbags may be deployed. By determining that certain airbags deploy at different pressures and different impacts, the processing circuitry may determine which part of the vehicle is damaged and how much damage there may be. Similarly, the sensors around the vehicle may be programmed on a certain pressure threshold. For example, when an impact to a front bumper occurs, the processing circuitry may correlate the pressure to the front of the vehicle to estimate the level of damage to the vehicle. Based on determining that only a small pressure change occurred (e.g., backing up while parking the vehicle), the level of damages may not exceed a damage threshold, the vehicle may not determine an impact occurred.

On the other hand, in response to the level of damage exceeding a damage threshold (e.g., multiple airbags were deployed, bumper pressure exceed a limit as determined by a sensor), the system may determine that an impact event has occurred. In some embodiments, the severity of the accident may be identified by the location of the damage. For example, if a rear bumper sensor is triggered and no additional sensors are triggered, the severity may be low. On the other hand, if multiple sensors at the rear of the vehicle stop transmitting a signal or transmit a signal indicative of an accident, then the severity may be determined to be high. Based on the determined severity, the accident may trigger one or more activities, e.g., requesting video content from vehicles and user devices, generating a context menu based on contextual parameters, etc.

In some embodiments, the processing circuitry 102 detects an impact based on loss of signal from one or more sensors on the exterior of the vehicle. In some embodiments, the processing circuitry 102 determines an impact event type (e.g., a side, a front, a rear, or a corner collision) and vehicle occupancy (e.g., driver, and passengers, if any) based on pressure sensors throughout the vehicle. In some embodiments, the processing circuitry 102 determines that an impact event occurred by one or more audible sensors configured to monitor elevated sounds. For example, a sudden elevated decibel sound may alert the operator that an impact event occurred. To avoid generating a false alarm that an impact event occurred, the processing circuitry 102 may perform an additional check, including pressure at the ultrasonic sensors and/or airbag activation.

In some embodiments, detecting that an impact event occurred is performed by computer vision to detect contact with the vehicle and be verified through small acceleration events that without computer vision would be insufficient to trigger an impact event. The processing circuitry 102 performs computer vision analysis using sensors around the vehicle's exterior to detect any movement of the vehicle and contact with the vehicle by another object. For example, a bumper-to-bumper collision in a parking lot that does not trigger airbag deployment may register by computer vision of the vehicle and the processing circuitry 102 of the vehicle 101 may determine that an impact event has occurred.

In some embodiments, the processing circuitry 102 determines the impact event by one or more accelerometer sensors configured to monitor changes in speed. For example, if the speed of the vehicle changes, the processing circuitry 102 may perform an impact event sensor check to ensure that all sensors on the exterior of the vehicle are responsive. In response to the sensors not responding, the processing circuitry 102 of the vehicle 101 may determine that an impact event has occurred.

In some embodiments, one or more of these sensors are used for assessment of the impact which is then displayed to the user using the user interface 110. For example, impact sensor 128 (e.g., inertial measurement unit, accelerometer, etc.), radar sensors 120 and cameras 122 may be used individually or in combination for determining impact events and providing the users of the vehicle with helpful information following the impact events using the cameras 122 and other sensors. In some embodiments, the systems and methods of the present disclosure may use some of the cameras 122 to record the surroundings and provide the captured video content relating to the impact event to another vehicle or a governmental authority, in accordance with some embodiments.

A user interface 110 (e.g., a steering wheel, a touch screen display, buttons, knobs, a microphone, or other audio capture devices, etc.) may be communicatively coupled to the processing circuitry 102 via input circuitry 108. In some embodiments, a user (e.g., driver or passenger) of vehicle 101 may be permitted to select certain settings in connection with the operation of vehicle 101 (e.g., select a predetermined area for the vehicle to protect). In some embodiments, processing circuitry 102 may be communicatively connected to a navigation system, e.g., Global Positioning System (GPS) system 135 via a communications circuitry 132 of vehicle 101, where the user may interact with the GPS system 135 via user interface 110. GPS system 135 may be in communication with multiple satellites to ascertain the vehicle's location and provide the current vehicle location to the processing circuitry 102. As another example, the positioning device may operate on terrestrial signals, such as cell phone signals, Wi-Fi signals, or ultra-wideband signals to determine a location of vehicle 101. The current vehicle location may be in any suitable form such as a geographic coordinate. In some embodiments, processing circuitry 102 uses the current vehicle location to make determinations about sending requests for sharing video content in the area surrounding the requestor vehicle 101. In some embodiments, processing circuitry 102 uses the current vehicle location to determine whether a request for sharing video content should be received by the responder vehicle 101. The received request for sharing recorded video content may be received from database 140 through cloud network 134, which may be communicatively reachable by way of the communications circuitry 132.

In some embodiments, processing circuitry 102 may be in communication (e.g., via communications circuitry 132) with a database 140 wirelessly through a server 138 and network 134. In some embodiments, some, or all of the information in database 140 may also be stored locally in memory 106 of vehicle 101. In some embodiments, the communications circuitry is communicatively connected to a secondary vehicle 136 using direct vehicle-to-vehicle communication. In some embodiments, the secondary vehicle 136 is communicatively coupled by wireless communication directly to the communications circuitry 132 or via the network 134 to database 140. For example, when the processing circuitry 102 determines a request for captured video content, the processing circuitry 102 may transmit the identified video content to the secondary vehicle 136 via the communications circuitry 132.

The processing circuitry 102 may also be communicatively connected to output circuitry 124, which is configured to manage a video sharing interface 126. The video sharing interface 126, by way of the output circuitry 124, may be communicatively connected to the user interface 110 and speakers 130 in order to communicate the request for sharing video content to the user of the responder vehicle 101.

It should be appreciated that FIG. 1 only shows some of the components of vehicle 101, and it will be understood that vehicle 101 also includes other elements commonly found in vehicles, e.g., a motor, brakes, wheels, wheel controls, turn signals, windows, doors, etc.

Figure 2:
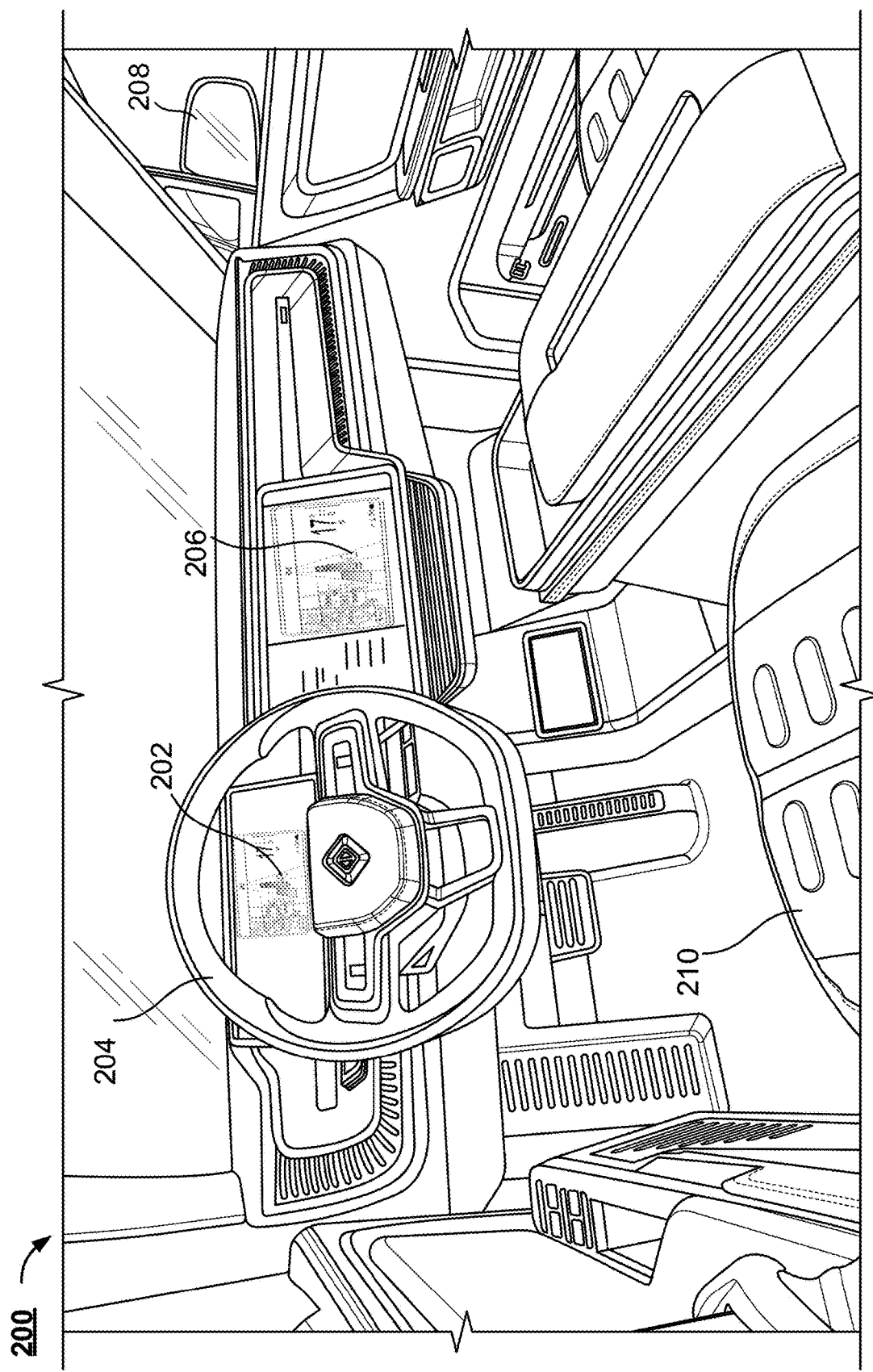
FIG. 2 shows an illustrative depiction of an interior of a vehicle in which user input interfaces and vehicle deterrence feature interface may be provided to a user, in accordance with some embodiments of the present disclosure.

FIG. 2 shows an illustrative depiction of an interior of a vehicle in which user input interface 110 and video sharing interface 126 may be provided to a driver, in accordance with some embodiments of the present disclosure. A vehicle interior or vehicle cabin 200 may comprise steering wheel 204, one or more displays 202 and/or 206, and driver seat 210. In some embodiments, the interior 200 of a vehicle may be the interior of vehicle 101 in FIG. 1. In some embodiments, the one or more displays 202 and/or 206 may be used as a user interface via touch screen, knobs, buttons, a microphone, or other audio capture devices. Processing circuitry 102 may be configured to receive user input by way of the steering wheel 204 or one or more of the displays 202 and/or 206, in order to allow the user to send a request for sharing video content that may have been captured in the surrounding area, or to respond to a request received by the vehicle 101 to share the video content recorded by the vehicle 101. In some embodiments, processing circuitry 102 may generate for display a local navigational view of the vehicle 101 and an interface to allow the user to select a geographical area within which a request for sharing video content should be sent, on one or more of the driver display 202 and/or the center display 206 of vehicle 101.

Additionally or alternatively, processing circuitry 102 may be configured to generate for output audio indicators or alerts (e.g., to audibly draw the user's attention to the notification) and/or other visual cues (e.g., conspicuous lighting patterns, such as flashing lights, in an effort to gain the user's attention, such as at light sources located at one or more of steering wheel 204, driver display 202, center display 206, a left side-view mirror, right side-view mirror 208, the rear-view mirror, cabin light, door light, etc.). The audio alerts may be in the form of speech-based instructions and/or an alarm-type indicator transmitted from speakers (e.g., repetitive, high-pitched chimes intended to urgently capture the user's attention). In some embodiments, processing circuitry 102 may generate for output tactile or haptic indicators (e.g., to provide tactile or haptic feedback to a driver, e.g., on driver's seat 210 or a passenger seat).

Figure 3:
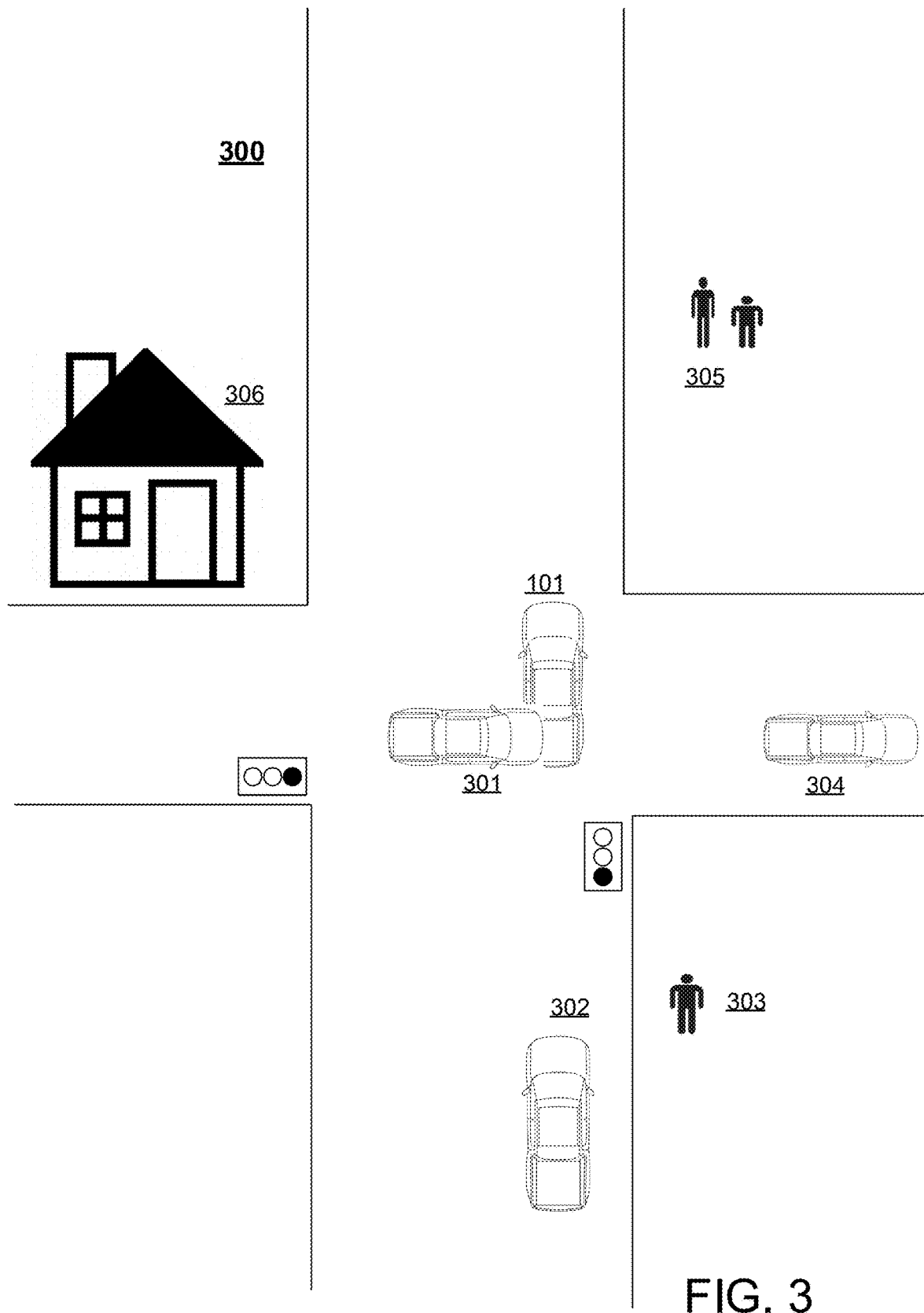
FIG. 3 shows an aerial view of a scenario in which two vehicles are involved in an impact event, in accordance with some embodiments of the present disclosure.

FIG. 3 shows an aerial view of a scenario in which two vehicles are involved in an impact event, in accordance with some embodiments of the present disclosure. As depicted in scenario 300, vehicle 101 and vehicle 301 are involved in an impact event in an intersection. Vehicle 101 crosses the intersection on a green light obeying the traffic rules. However, vehicle 301 crosses the intersection on a red light at the same time as vehicle 101 and ends up in an impact event with vehicle 101 at the intersection. During this impact event, other vehicles on the street may be recording video content and may have captured footage of the impact event.

Vehicle 302 and vehicle 304 are two additional vehicles near the intersection where the impact event between vehicle 101 and vehicle 301 takes place. The rear camera of vehicle 304 may have been able to capture a clear video content of the impact event showing that the traffic light was red for vehicle 301 while it crossed the intersection. Additionally, the front camera on vehicle 302 may have captured video content depicting that the traffic light was green for vehicle 101 when it crossed the intersection. Both video contents captured by vehicles 302 and 304 may provide valuable information about the impact event.

In accordance with the present disclosure, following the impact event of scenario 300, requestor vehicle 101 may send out a request to vehicles 302 and vehicle 304 for sharing captured video content which may relate to the impact event. Such a request may be sent directly from vehicle 101 to vehicle 302 and vehicle 304 using vehicle-to-vehicle communication. The request may additionally or alternatively be sent through a cloud-based network.

Upon receipt of the request from vehicle 101, vehicle 302 and vehicle 304 may be prompted to respond to the request. Such a prompt may be provided to the users of the vehicle 302 and vehicle 304 via the user interface located within the respective vehicles, in some embodiments. The users of vehicle 302 and vehicle 304 may then respond to the request by making a selection on the user interface. In some embodiments, the users of vehicle 302 and vehicle 304 may have preset the video content sharing settings and may automatically share the captured video content relevant to the impact event with vehicle 101 upon receiving the request.

Additional people may be in the vicinity of the impact event and may have been witness to the event. According to the scenario 300, witness 303 and witness 305 may have been present on the side of the road close to the location of the impact event between vehicle 101 and vehicle 301. In some embodiments, witness 303 and witness 305 may be using a video recording device and may have captured video content relevant to the impact event. Following the impact event of scenario 300, requestor vehicle 101 may send out a request to witness 303 and witness 305 for sharing captured video content from their user devices which may relate to the impact event. Such a request may be sent directly from the vehicle 101 to the user devices of witness 303 and witness 305, according to some embodiments. The request may additionally or alternatively be sent through a cloud-based network, according to some embodiments.

Upon receipt of the request from requestor vehicle 101, witness 303 and witness 305 may be prompted to respond to the request. Such a prompt may be provided to the witness 303 and witness 305 via the user interface on their respective user devices. Witness 303 and witness 305 may then respond to the request by making a selection on the user interface. In some embodiments, witness 303 and witness 305 may have preset the video content sharing settings on their user devices and may automatically share the captured video content relevant to the impact event with vehicle 101 upon receiving the request.

In some embodiments, the user device of witness 303 and witness 305 may be a mobile phone. In some embodiments, the user device of witness 303 and witness 305 may be a camera or any other device capable of recording video content.

In some embodiments, security cameras on buildings surrounding the intersection, where the impact event occurred, may also provide valuable information about the impact event. As depicted in scenario 300, a building 306 is located near the intersection where the impact between vehicle 101 and vehicle 301 occurred. The building 306 may be equipped with a security camera pointed in the direction of the impact event, and video captured through that security camera may show that the traffic light was red when vehicle 301 crossed the intersection. Following the impact event of scenario 300, vehicle 101 may send out a request to building 306 for sharing captured video content from its security which may relate to the impact event. In some embodiments, such a request may be sent directly from the vehicle 101 to the user interface of the security camera installed on the building 306. In some embodiments, the request may additionally or alternatively be sent through a cloud-based network 134. In some embodiments, the vehicle 101 may communicate with internet service providers (ISP) servicing the area to request information about all active user devices in the area. The vehicle 101 may then use the supplied information to send the requests for video content directly to those devices using a Wi-Fi network. In some embodiments, the vehicle 101 may request the ISP to send out the requests for video content to all active devices.

Upon receipt of the request from requestor vehicle 101, building 306 may be prompted to respond to the request. Such a prompt may be provided to the owner or occupant of the building 306 via the user interface or control device of the security camera installed on the building 306. The building 306 may then respond to the request by the owner or occupant making a selection on the user interface of the security camera, according to this embodiment. Alternatively, the building 306 may have preset the video content sharing settings on their security camera and may automatically share the captured video content relevant to the impact event with requestor vehicle 101 upon receiving the request, according to some embodiments.

Figure 4:
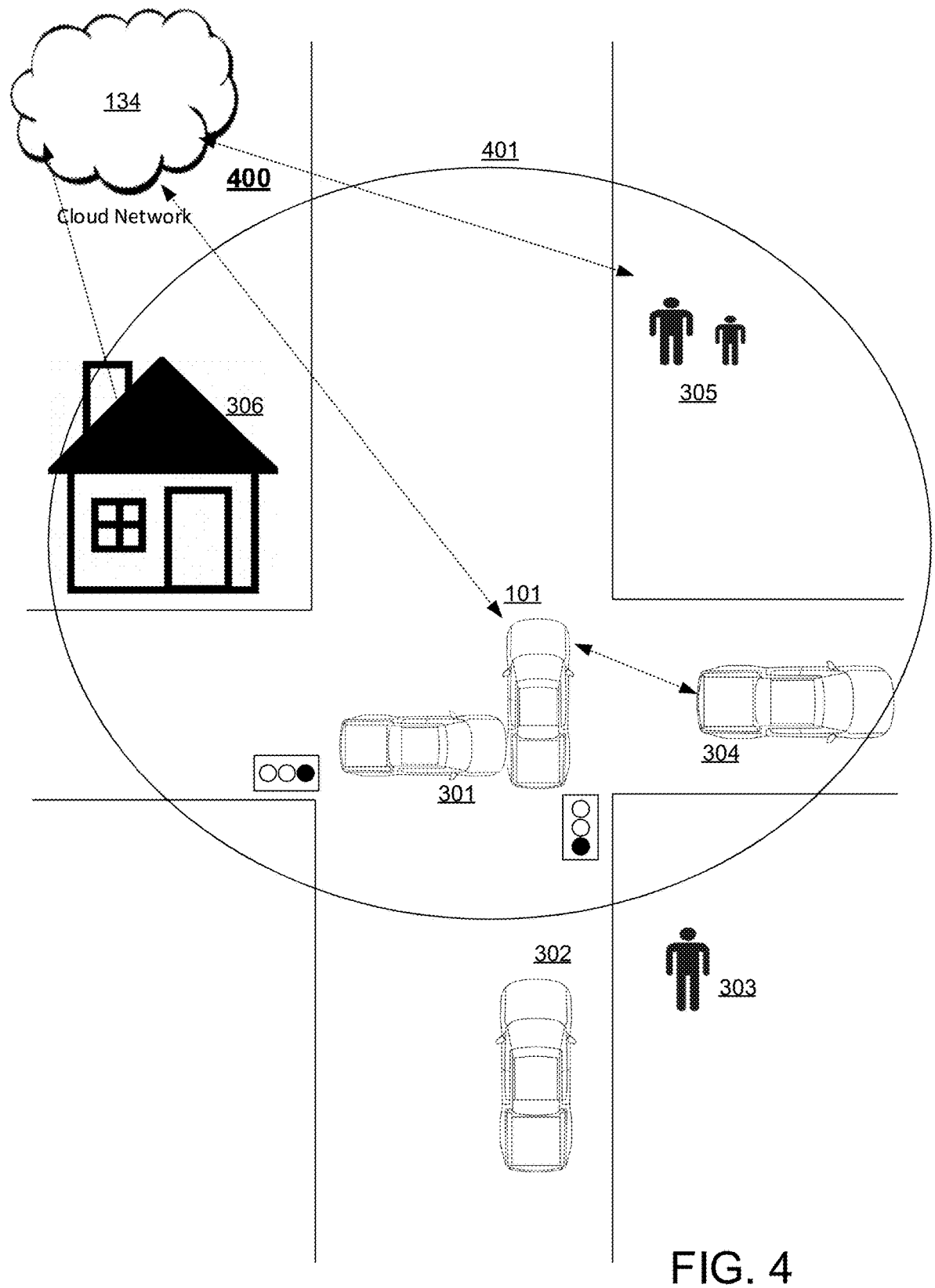
FIG. 4 shows an aerial view of a scenario in which two vehicles are involved in an impact event and an area of interest surrounding the impact event, in accordance with some embodiments of the present disclosure.

In some embodiments, the request sent out via requestor vehicle 101 may be limited to vehicles, witnesses, buildings, and the like located within an area of interest. For example, during a rush hour period, the area around the intersection may be occupied with hundreds of vehicles and witnesses. In such a scenario, it may be more efficient to send the request for sharing video content within a specific area of interest. The request may include identification of an area of interest so that only the devices within that area of interest receive the request for video content. Scenario 400 of FIG. 4 depicts such an embodiment of scenario 300 along with an area of interest, where vehicle 101 sends out a request for video content only to vehicles, witnesses, buildings, and the like within a specific radius 401 surrounding the impact location. The vehicle 101 may do so by obtaining the geographical location of the vehicles, witnesses, buildings, and the like and comparing it to the geographical area of interest and determining if the location of the vehicles, witnesses, buildings, and the like falls within the area of interest. The vehicle 101 may obtain the geographical location of the vehicles, witnesses, buildings, and the like via numerous means, for example, via direct communication over a Wi-Fi or Bluetooth® network, via an ISP provider in the area, via the sensor interface 112 of the vehicle 101. While means of obtaining the geographical location of the vehicles, witnesses, buildings, and the like are listed herein, the means of obtaining the same are not limited thereto and other means may be utilized by the vehicle to obtain the geographical location of the vehicles, witnesses, buildings, and the like.

FIG. 4 shows an aerial view of a scenario 400 in which two vehicles are involved in an impact event and an area of interest surrounding the impact event, in accordance with some embodiments of the present disclosure.

In scenario 400, vehicle 304, witness 305 and building 306 are within the radius 401 surrounding the impact event. Vehicle 101, according to this embodiment, only sends the request to share video content to vehicle 304, witness 305 and building 306. In some embodiments, the request may be sent from vehicle 101 to vehicle 304 via a direct vehicle-to-vehicle communication and the request from vehicle 101 to witness 305 and building 306 may be sent via a cloud-based network 134. In some embodiments, the request from vehicle 101 may be sent to vehicle 304, witness 305 and building 306 through the cloud-based network without any direct communication.

Vehicle 302 and witness 303 may be considered too far from the impact event and may not receive a request from requestor vehicle 101 to share the captured video content, according to some embodiments.

Upon receipt of the request from requestor vehicle 101, vehicle 304, witness 305 and building 306 may be prompted to respond to the request. Such a prompt may be provided to the occupant of the vehicle 304 via the user interface located inside the vehicle 304, to the witness 305 on the user interface of witnesses' user device, and to the owner or occupant of the building 306 via the user interface or control device of the security camera installed on the building 306, in some embodiments. The vehicle 304, witness 305 and building 306 may then respond to the request in a similar manner as described with reference to FIG. 3.

In some embodiments, the request sent out via requestor vehicle 101 may be limited to vehicles, witnesses, buildings, and the like located within an area of interest dependent on the direction of the impact event. For example, if the impact between vehicle 101 and vehicle 301 occurred in a manner that the left side of vehicle 101 was the point of impact, the area of interest 503 may be decided based on the direction of travel of the vehicles involved in the impact event as well as the side of the vehicle damaged in the impact. In this scenario, it may be more efficient to send the request for sharing video content within the area of interest 503 which helps provide information on the traffic signal as well as the vehicles' direction of travel. In some embodiments, it may be more efficient to send the request for sharing video content only to vehicles located within certain sections of the intersection and map data may be used to determine vehicles located within one or more sections of a street or intersection.

Figure 5:
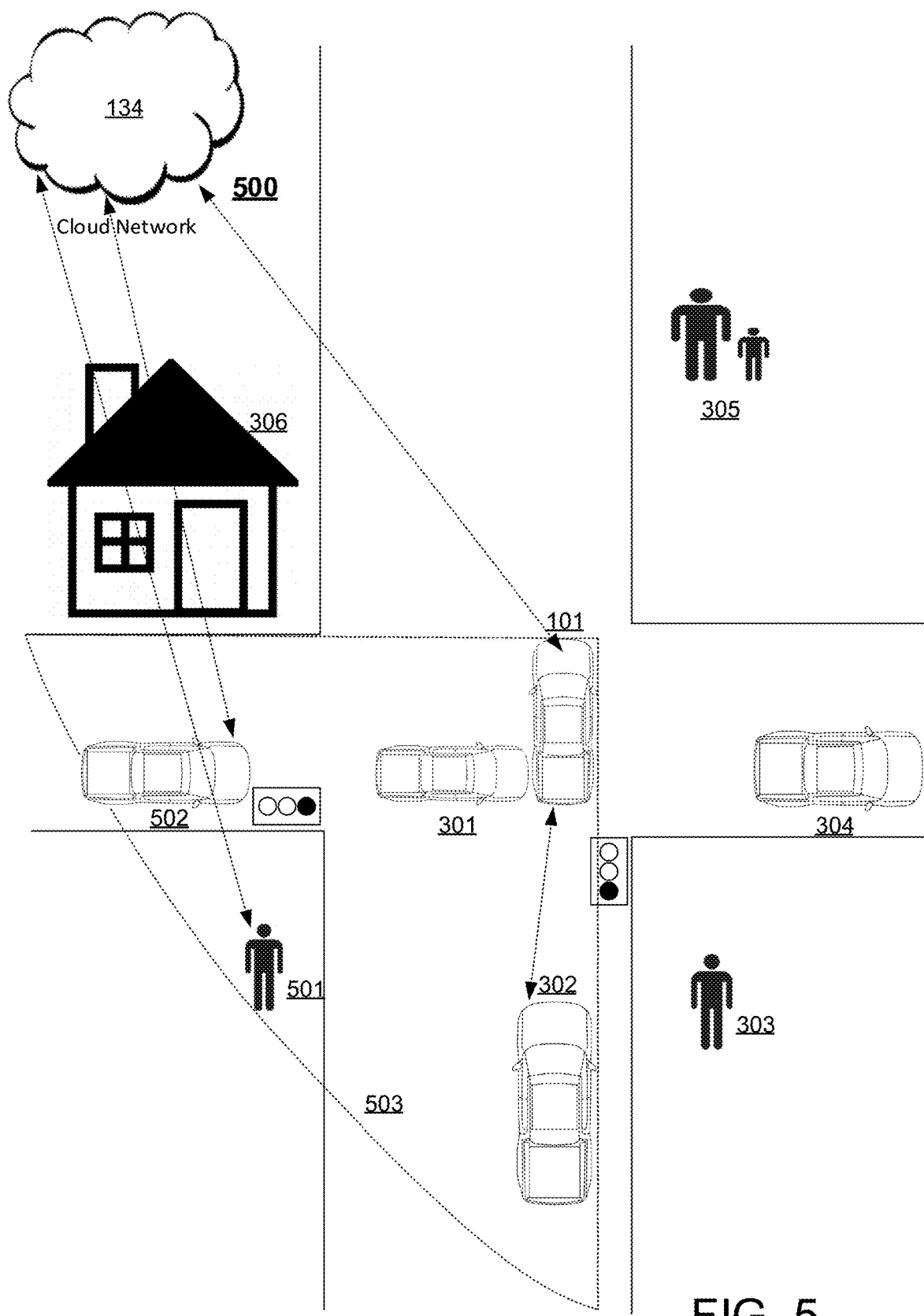
FIG. 5 shows an aerial view of a scenario in which two vehicles are involved in an impact event and an area of interest based on a direction of impact, in accordance with some embodiments of the present disclosure.

FIG. 5 shows an aerial view of a scenario in which two vehicles are involved in an impact event and an area of interest based on a direction of impact, in accordance with some embodiments of the present disclosure. Scenario 500 depicts such an embodiment of scenario 300 with an area of interest 503, where requestor vehicle 101 sends out a request for video content only to vehicles, witnesses, buildings, and the like within a specific area of interest 503.

In scenario 500, vehicle 302, vehicle 502 and witness 501 are within the area of interest 503 surrounding the impact event. Vehicle 101, according to this embodiment, only sends the request to share video content to vehicle 302, vehicle 502 and witness 501. In some embodiments, the request may be sent from vehicle 101 to vehicle 302 via a direct vehicle-to-vehicle communication and the request from requestor vehicle 101 to vehicle 502 and witness 501 may be sent via a cloud-based network 134. In some embodiments, the request from requestor vehicle 101 may be sent to vehicle 302, vehicle 502 and witness 501 through the cloud-based network without any direct communication. In some embodiments, only certain cameras on the vehicle 502 may have been able to capture useful information relating to the impact event between vehicle 101 and 301. For example, cameras located on the rear of vehicle 502 may not provide valuable information about the impact event in scenario 500 and accordingly, recorded video content from the rear camera of vehicle 502 may not be requested or shared by vehicle 502.

Vehicle 304, building 306, witness 303 and witness 305 may be considered less helpful in providing useful information about the impact event in light of their location and may not receive a request from requestor vehicle 101 to share the captured video content, according to some embodiments.

Upon receipt of the request from requestor vehicle 101, vehicle 302, vehicle 502 and witness 501 may be prompted to respond to the request. Such a prompt may be provided to the occupant of the vehicle 302 and vehicle 502 via the user interface located inside the vehicle 302 and vehicle 502 respectively and to the witness 501 on the user interface of witnesses' user device. The vehicle 302, vehicle 502 and witness 501 may then respond to the request by the user making a selection on the user interface of the vehicle 302, vehicle 502 and the user device of the witness 501. Alternatively, the vehicle 302, vehicle 502 and witness 501 may have preset the video content sharing settings and may automatically share the captured video content relevant to the impact event with vehicle 101 upon receiving the request, according to some embodiments.

Figure 6:
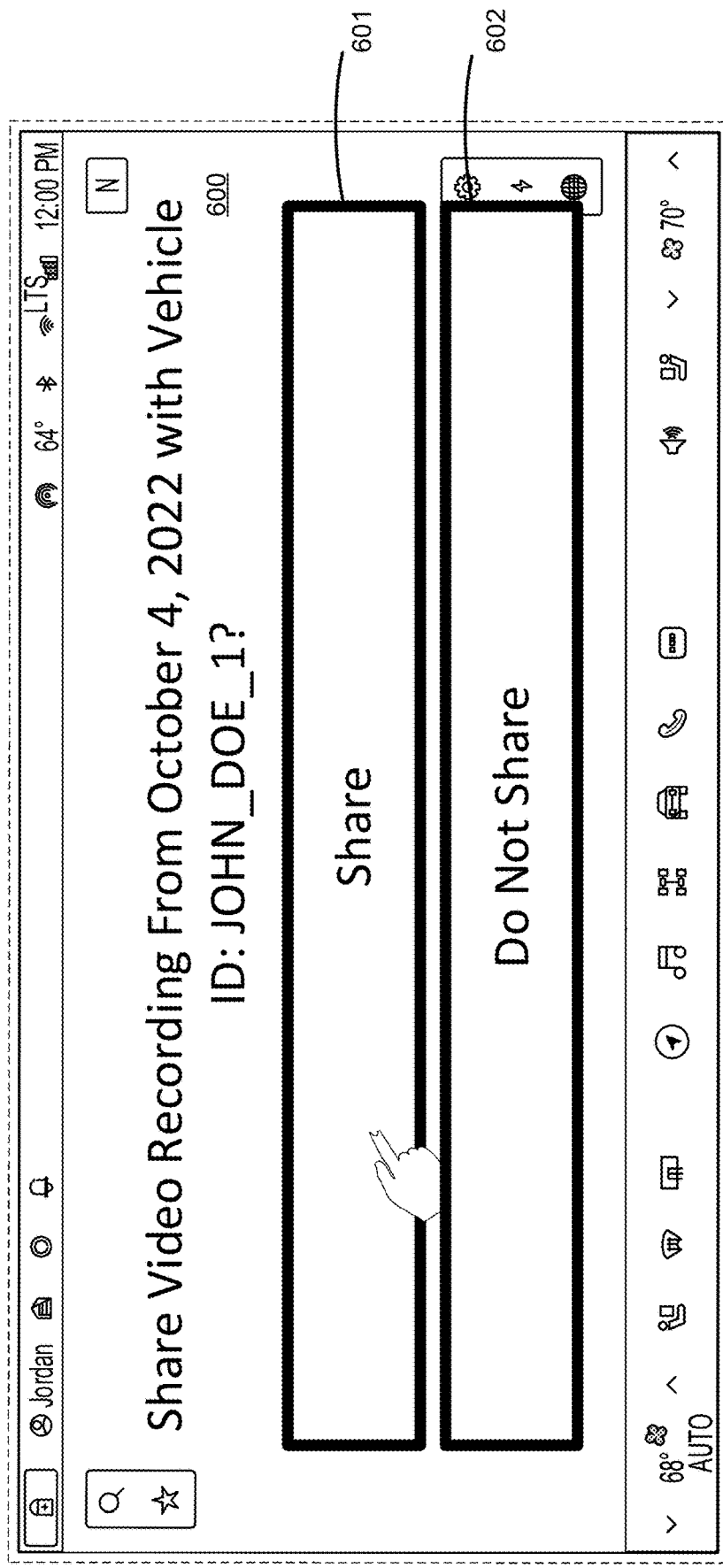
FIG. 6 shows a user interface depicting a request to share captured video content, in accordance with some embodiments of the present disclosure.

FIG. 6 shows a user interface depicting a request to share captured video content, in accordance with some embodiments of the present disclosure. In some embodiments, when a vehicle 101 receives a request to share a captured video content, the user of the vehicle may be presented with a prompt on the user interface 110 located within the vehicles. In some embodiments, this request to share video content may be received directly from another vehicle which may have been a party to an impact event, using vehicle-to-vehicle communication. In some embodiments, this request to share video content may be received via a cloud-based network 134 from another vehicle. In some embodiments, the request to share video content may be received from a governmental agency.

In some embodiments, the user is presented with a prompt on the user interface 110 located within the vehicle 101, upon receipt of a request to share captured video content. The processing circuitry 102 within the vehicle 101 may review the request and determine which specific videos correspond to the request and identify those videos on the user interface 110 as part of the prompt. The determination on the relevant videos may be made based on the timestamp of the videos in correlation to the timestamp of the request and timestamp of the impact event, in some embodiments. The determination on the relevant videos may be made based on at least one of the location and the direction of the impact event in relation to at least one of the location and the direction of the vehicle, in some embodiments.

The prompt illustrated in FIG. 6 provides the user with the information of the relevant video corresponding to the request and requests the user to provide an input approving or denying the share request. In some embodiments, the prompt may only provide the user with the date of the videos to be shared and an identification of the vehicle requesting the video content. In some embodiments, a specific timestamp of the video content to be shared may be displayed as part of the prompt. In some embodiments, a preview of the exact video to be shared may be presented on the user interface as part of the prompt. In some embodiments, a plurality of videos may be presented to the user on the user interface and the user may be able to select which of the presented videos they want to share. It is understood that numerous other iterations and formats of this prompt may be presented to the user and are all within the scope of the subject matter of this disclosure.

Once the user provides their input and approves the share request by selecting option to share 601, the processing circuitry may share the video content with the requesting party directly via vehicle-to-vehicle communication, in some embodiments. In some embodiments, the vehicle may share the video content with the requesting party by uploading the video content to a cloud storage, which may then be downloaded to the requesting party from the cloud storage. A remote server 138 may be used to store shared video along with relevant information relating to the video, impact event, sharing party, and requesting party. For example, a vehicle manufacturer may use cloud storage to store information about the vehicle sharing the video and the shared videos. The request may include a virtual address (e.g., IP address, address for governmental agencies, remote server) for where to send the shared videos. In some embodiments, the sharing party may share the videos instantly (e.g., over cellular) or may choose to share the videos at a later time when the vehicle is connected to a Wi-Fi network (e.g., when the vehicle is in a garage at a user's home or place of business). In some embodiments, the user may select only a few of the relevant videos on the user interface and only the selected video content may be shared with the requesting party.

Alternatively, if the user decides not to share the requested video content by selecting the option to reject the request 602, the request is denied, and no further action is taken. In some embodiments, the processing circuitry 102 may generate a message rejecting the request and send the message back to the requesting party either directly using vehicle-to-vehicle communication or through a cloud-based network.

Figure 7:
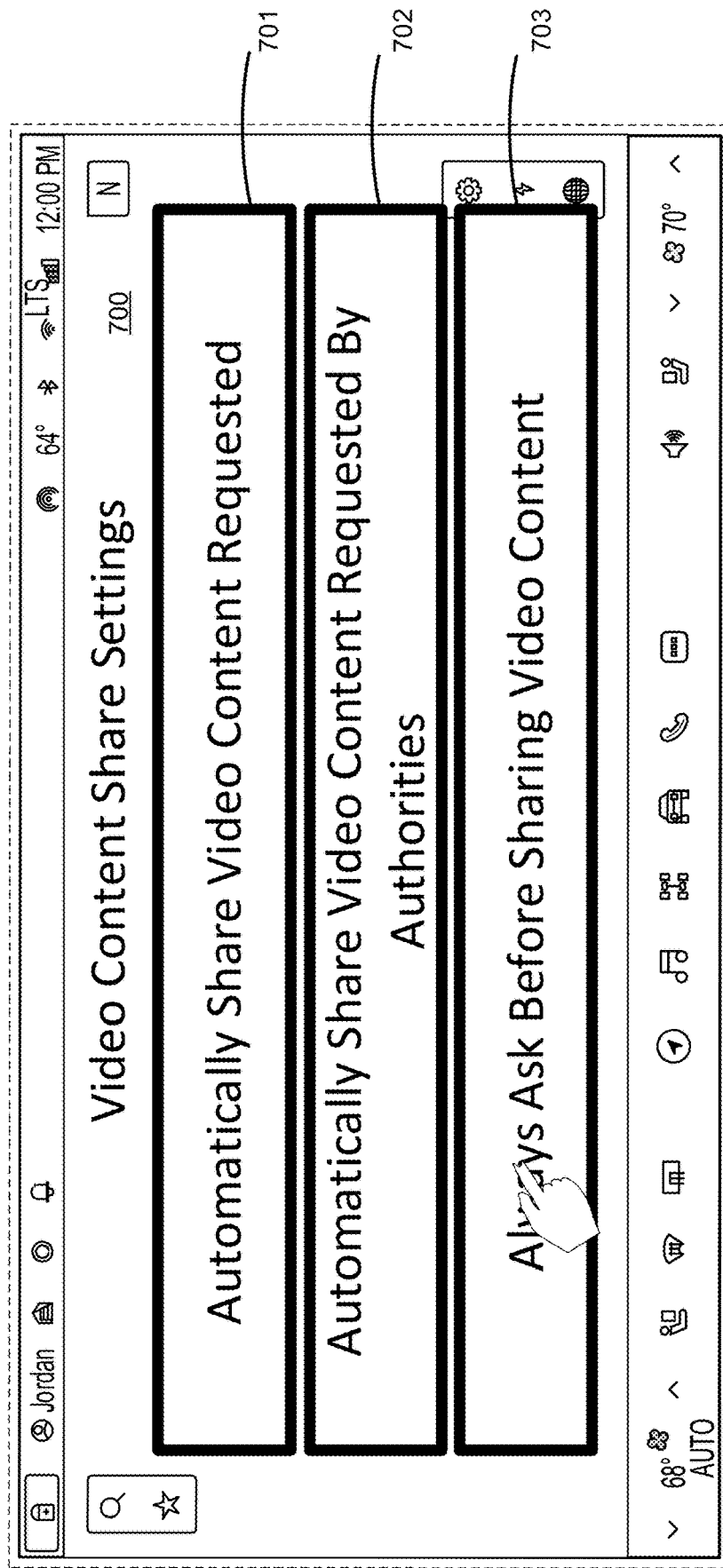
FIG. 7 shows a user interface depicting settings related to sharing captured video content, in accordance with some embodiments of the present disclosure.

FIG. 7 shows a user interface depicting settings related to sharing captured video content, in accordance with some embodiments of the present disclosure. In some embodiments, the user may preconfigure their settings to automatically share the video content whenever requested by any party by selecting option 701. When such a setting is made in the system, whenever the responder vehicle 101 receives a request, the processing circuitry 102 will automatically share the relevant video content with the requesting party without prompting the user every time such a request is received. In some embodiments, a user may select to automatically share all requested video content only if the requesting party is a governmental agency by selecting option 702. When such a setting is selected, the user may not be prompted in the event video content is requested by a governmental agency. However, if the video content request is made by another vehicle, the user may be prompted to decide whether to share the video content or not as described above with reference to FIG. 6. A notification on the user interface 110 may notify the user that the video content is being shared per the settings.

In some embodiments, the user may select a setting to always be prompted whenever a request for sharing video content is received by selecting option 703. Under such a selection, irrespective of the type of party requesting the video content, the user is always prompted to decide whether to share the video content or not. In some embodiments, the user may be able to preconfigure a setting such that only during certain time frames or days of the week (for example, the user may only want to be prompted during the daytime and does not want to be disturbed while driving in the dark) the user is prompted to make a decision on whether to share the video content or not, and the sharing request is automatically approved outside of those time frames or days of the week. In some embodiments, the user may be able to preapprove a number of specific vehicles (e.g., vehicles owned by friends and family, police vehicles) and any request for videos from those preapproved vehicles is automatically approved without the user being prompted. In some embodiments, the vehicle may allow multiple users to maintain their own settings for sharing the video content automatically.

Although an embodiment of the settings menu on the user interface 110 is depicted in FIG. 7, it is understood that numerous different iterations of the setting menu may be available to the user and are all within the scope of the subject matter of this disclosure.

Figure 8:
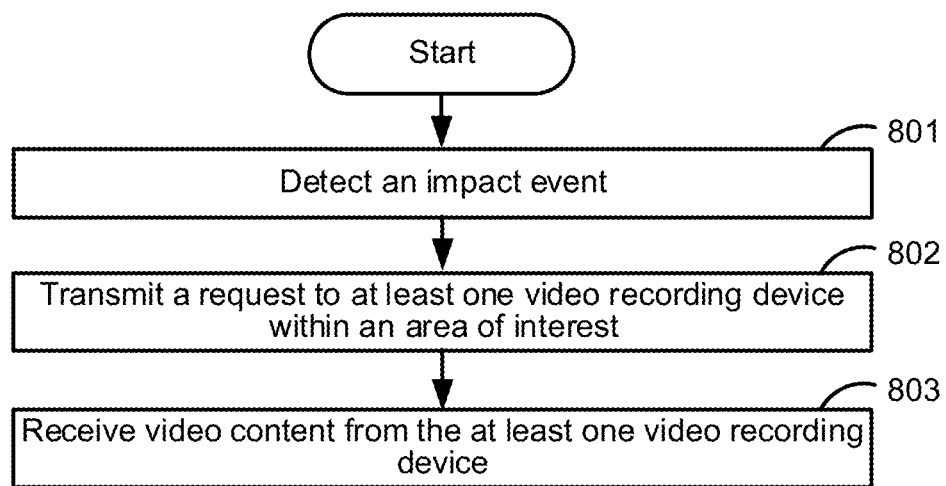
FIG. 8 shows a flowchart of an illustrative process to request and receive video content by a vehicle, in accordance with some embodiments of the present disclosure.

FIG. 8 shows a flowchart of an illustrative process to request and receive video content by a vehicle, in accordance with some embodiments of the present disclosure. In some embodiments, process 800 is executed by processing circuitry 102 of the vehicle 101. In some embodiments, the process 800 may be executed by processing circuitry distributed across multiple systems and the received video content is shared in a remote storage for later access by the requesting party.

At 801, the processing circuitry 102 detects if the vehicle 101 has been in an impact event. This may be determined based on detection of damage to different components of the vehicles through the sensor interface 112. In some embodiments, the sensor interface may detect a crash and send a signal to the processing circuitry 102 informing the processing circuitry 102 of the impact event. The processing circuitry 102 may make a further determination, based on the information received from the sensor interface 112, whether another vehicle was involved in the impact event or if vehicle 101 was the sole vehicle.

At 802, the processing circuitry 102 of requestor vehicle 101 transmits a request to share video content recorded to at least one video recording device within an area of interest. The processing circuitry 102 may send out this request to other vehicles, other user devices, building security cameras and the like for sharing captured video content which may relate to the impact event. Such a request may be sent directly from vehicle 101 to another vehicle using vehicle-to-vehicle communication, according to an embodiment. The request may be sent through a cloud-based network, according to some embodiments. In some embodiments, the request may incorporate specific location and time stamp information of the impact event and this information may be used by the recipient to determine the relevant video content to be shared. In some embodiments, the request may include information relating to the license plate of the vehicle 101 or another vehicle. In some embodiments, the request may include a description of the requestor vehicle 101 or another vehicle.

At 803, the processing circuitry 102 of requestor vehicle 101 receives the video content from at least one video recording device. The requestor vehicle 101 may receive this information directly from another vehicle using vehicle-to-vehicle communication, in some embodiments. In some embodiments, the vehicle 101 may receive the video contents through a cloud-based network 134. In some embodiments, the video being shared may be stored on a remote server for access at a later time. The remote server may be a server managed by the vehicle manufacturer storing information about the vehicle at the remote server. In some embodiments, the identification information of the sender of the video content may be received along with the video content. In some embodiments, the received video content may have been sent anonymously.

Once the video content has been received by the vehicle 101, the user of vehicle 101 may use the video content to determine important information about the impact event and may provide this video content to relevant law enforcement and insurance agencies, in accordance with some embodiments.

Figure 9:
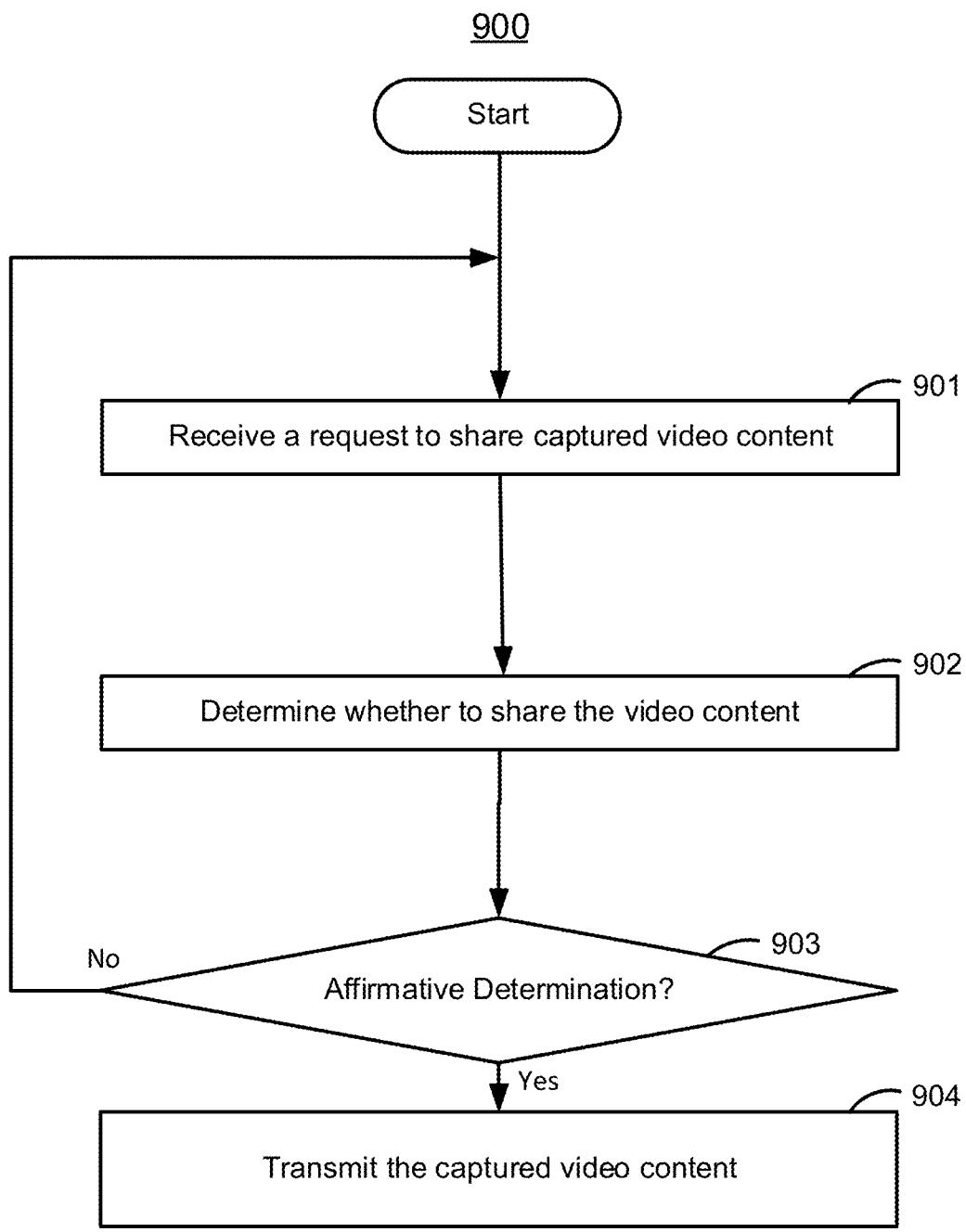
FIG. 9 shows a flowchart of an illustrative process to receive and transmit video content from a vehicle or a user device, in accordance with some embodiments of the present disclosure.

FIG. 9 shows a flowchart of an illustrative process to receive and transmit video content from a vehicle or a user device, in accordance with some embodiments of the present disclosure. In some embodiments, process 900 is executed by processing circuitry 102 of the vehicle 101 or processing circuitry of a user device.

At 901, the processing circuitry 102 of responder vehicle 101 receives a request to share a captured video content. The request may be received directly from another vehicle using a vehicle-to-vehicle communication, in accordance with some embodiments. The request may alternatively be received through a cloud network from another vehicle or from a governmental agency, in accordance with some embodiments. The request may include information regarding the requesting party, information regarding the impact event (e.g., the time of the impact event, the location of the impact event, and/or the direction of the impact event), a request for sharing video content, an area of interest, any other information, or any combination thereof.

Upon receipt of the request, at 902, the processing circuitry 102 of responder vehicle 101 makes a determination regarding sharing the requested video content. The processing circuitry 102 of vehicle 101 may make this determination by preconfigured settings set by the user regarding sharing the video content when such a request is received, as discussed above with reference to FIG. 7. If such preconfigured settings are not in place, or if the settings require the user to be prompted upon receipt of such a request, the user may be prompted to respond to the request for sharing video content. The user may be prompted using the user interface 110 located inside the responder vehicle 101, as shown above with reference to FIG. 6. The user may be prompted using the speakers 130 using an audible notification requiring a verbal response from the user. The user may be notified using an application relating to the vehicle installed on the user's mobile device.

The processing circuitry 102 within the responder vehicle 101 may review the request and determine which specific videos correspond to the request and identify those videos on the user interface as part of the prompt. The determination on the relevant videos may be made based on the timestamp of the videos in correlation to the timestamp of the request and timestamp of the impact event, in accordance with some embodiments. The determination on the relevant videos may be made based on at least one of the location and the direction of the impact event in relation to at least one of the location and the direction of the vehicle (e.g., to identify videos that captured the impact event and/or traffic signals), in accordance with some embodiments.

The prompt may provide the user with the information of the relevant video corresponding to the request and wait for the user to provide an input approving or denying the share request. In some embodiments, the prompt may only provide the user with the date of the videos to be shared and an identification of the vehicle requesting the video content. In some embodiments, a specific timestamp of the video content to be shared may be displayed as part of the prompt. In some embodiments, a preview of the exact video to be shared may be presented on the user interface as part of the prompt. In some embodiments, a plurality of videos may be presented to the user on the user interface and the user may be able to select which of the presented videos they want to share. It is understood that numerous other iterations and formats of this prompt may be presented to the user and are all within the scope of the subject matter of this disclosure.

At 903, it is determined if the user of the responder vehicle 101 approved the share request or denied it based on the user settings or the input received from the user. If the user approves the share request, at 904, the processing circuitry 102 of vehicle 101 may share the video content with the requesting party directly via vehicle-to-vehicle communication, in some embodiments. In some embodiments, the vehicle 101 may share the video content with the requesting party by uploading the video content to a cloud storage, which may then be downloaded to the requesting party from the cloud storage. In some embodiments, the user may select only a few of the relevant videos on the user interface and only the selected video content may be shared with the requesting party.

If it is determined that the user does not intend to share the requested video content, the request is denied, and no further action is taken. In some embodiments, the processing circuitry 102 of vehicle 101 may generate a message rejecting the request and send the message back to the requesting party either directly using vehicle-to-vehicle communication or through a cloud-based network.

Figure 10:
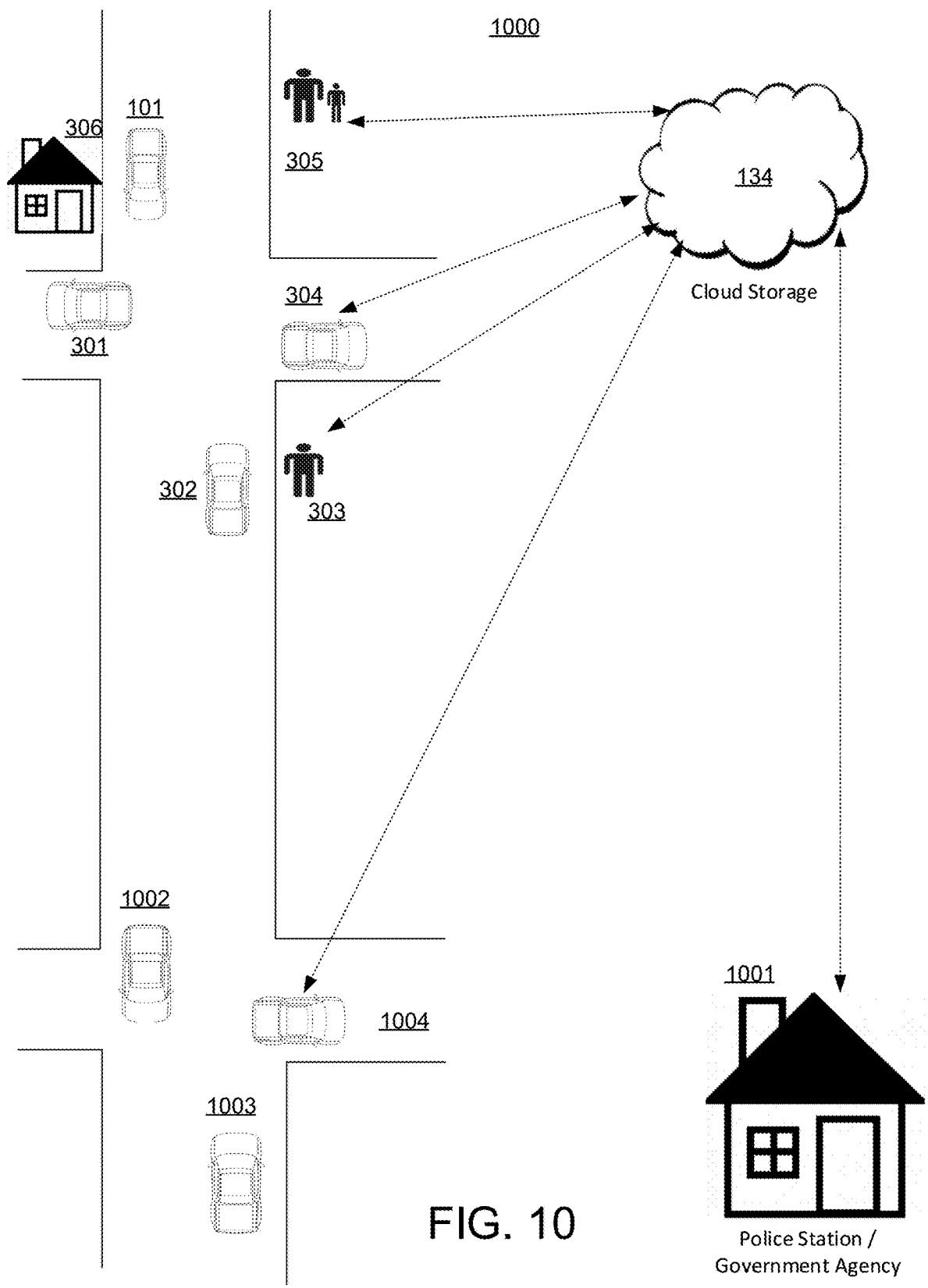
FIG. 10 shows an aerial view of a scenario in which a governmental agency requests video content from vehicles and user devices, in accordance with some embodiments of the present disclosure.

FIG. 10 shows an aerial view of a scenario in which a governmental agency requests video content from vehicles and user devices, in accordance with some embodiments of the present disclosure. In some embodiments, a government agency 1001 may want to collect video content from vehicles and user devices relating to a specific event. The specific event may be an impact event, a hit and run scenario, a kidnapping or missing person, and any other event of interest to the governmental agency. Accordingly, the government agency may send out a request to a plurality of vehicles, user devices and other video recording devices to share video content relating to the event of interest In accordance with some embodiments, as shown in scenario 1000, the governmental agency may send a video content sharing request to a plurality of vehicles and user devices through a cloud-based network 134. The selection of recipients of the request may be based on the area of interest, as previously described, in accordance with some embodiments. The selection of recipients of the request for video content may alternatively be based on the owners of the vehicles or user devices, registration of the vehicles and devices or other information relating to the users, vehicles, or user devices, in accordance with some embodiments. The request is sent to vehicle 304, vehicle 1004, witness 303 and witness 305, in accordance with some embodiments. The request for video content may be accompanied by a license plate number and the description of a vehicle of interest, in accordance with some embodiments. The request for video content may also be accompanied with a timestamp and location of interest, in accordance with some embodiments. The request may be sent out to a specific area of interest based on the event of interest in question and the type of government agency, in accordance with some embodiments.

In scenario 1000, building 306, vehicle 101, vehicle 301, vehicle 302, vehicle 1002 and vehicle 1003 do not receive the request for video content sharing from the government agency because they are not within the area of interest. In some embodiments, they may receive the request for video content sharing but take no action because they are not within the area of interest.

Upon receipt of the request from the government agency 1001, vehicle 1004, vehicle 304, witness 303, and witness 305 may be prompted to respond to the request. Such a prompt may be provided to the occupant of the vehicle 1004 and vehicle 304 via the user interface located inside the vehicle 1004 and vehicle 304 respectively, and to the witness 303 and witness 305 on the user interface of the respective witnesses' user devices. The processing circuitry 102 within the responder vehicle 101 or user device receiving the request may use information received with the request to determine the video content of interest. This determination may be made by correlating the content in the videos captured with the information received along with the request for video content from the government agency 1001. For example, the request may include a license plate number and the processing circuitry 102 of the vehicle 101 or user device may search the recorded video content to determine if the license plate information was captured in the recorded video. The request may include a color and description of a vehicle of interest and the processing circuitry 102 of the responder vehicle 101 or user device may search the recorded video content to determine if a vehicle matching the description was captured in the video content.

The vehicle 1004, vehicle 304, witness 303 and witness 305 may then respond to the request by the user making a selection on the user interface of the vehicle 1004 and vehicle 304 and the user devices of the witness 303 and witness 305, as described above with reference to FIG. 6. The users of vehicle 1004, vehicle 304, witness 303 and witness 305 may have preset the video content sharing settings and may automatically share the captured video content relevant to the event of interest with the government agency 1001 upon receiving the request, according to some embodiments. The transmission of the video from vehicle 1004, vehicle 304, witness 303 and witness 305 may be done through a cloud-based network 134, in accordance with some embodiments.

Figure 11:
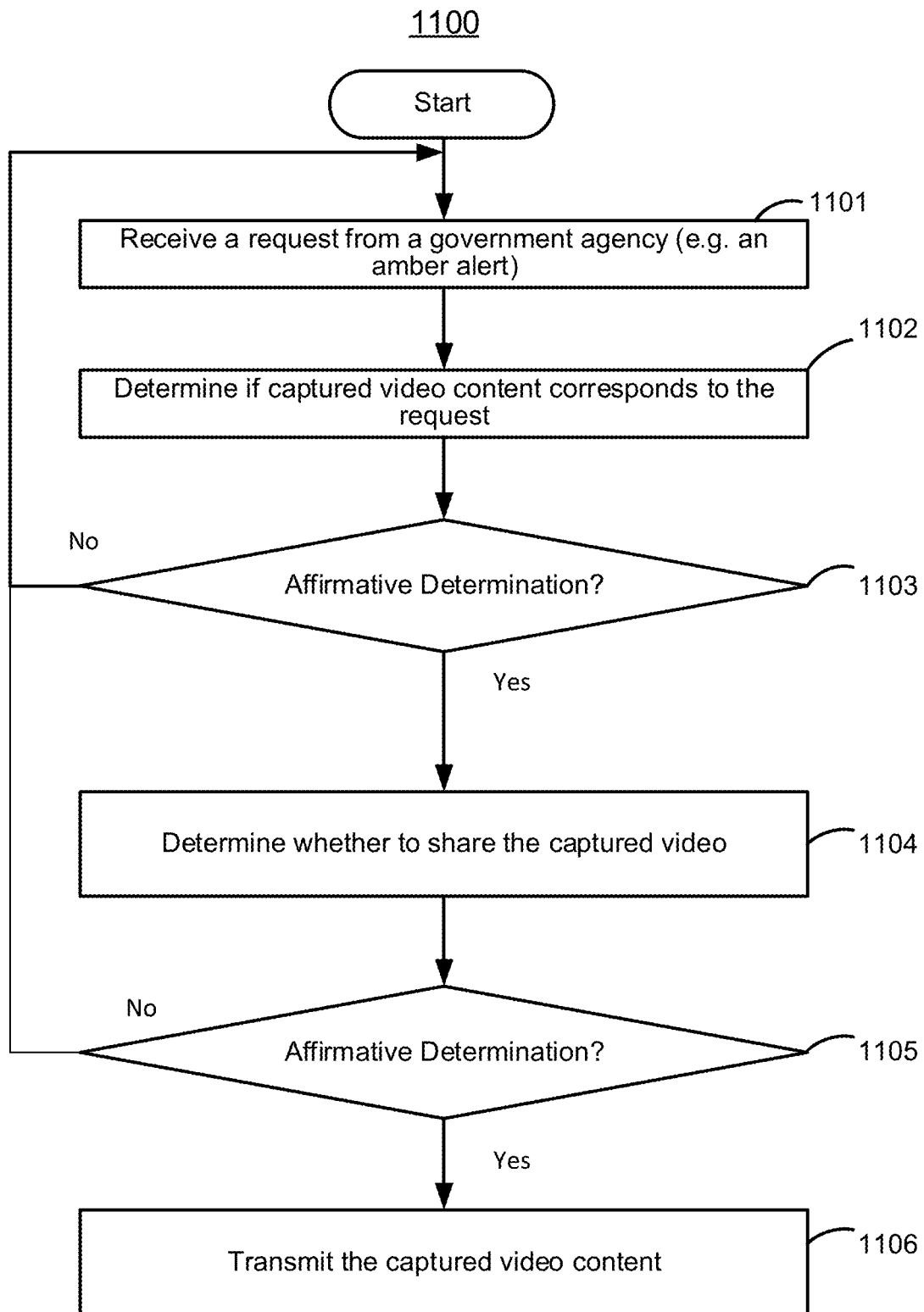
FIG. 11 shows a flowchart of an illustrative process to receive and transmit video content from a vehicle or a user device to a governmental agency, in accordance with some embodiments of the present disclosure.

FIG. 11 shows a flowchart of an illustrative process to receive and transmit video content from a vehicle or a user device to a governmental agency, in accordance with some embodiments of the present disclosure. In some embodiments, process 1100 is executed by processing circuitry 102 of the vehicle 101 or user device receiving the request for video content sharing. At 1101, the processing circuitry 102 of responder vehicle 101 receives a request from a government agency to share video content (e.g., as part of an alert such as an Amber alert or Silver alert). The request may be accompanied with license plate information and a description of a vehicle of interest. The request may incorporate a location and time frame of an event of interest.

At 1102, the processing circuitry 102 of responder vehicle 101 may determine if the captured video content in its database corresponds to the request. In some embodiments, the processing circuitry 102 may make this determination by correlating the received request against the captured video content. For example, if the received request incorporates a license plate number, the processing circuitry 102 of responder vehicle 101 may analyze the captured video content to look for the matching license plate number. In accordance with some embodiments, if the request provides a location and timeframe information, the processing circuitry 102 of vehicle 101 may determine the presence of relevant video content by correlating the timestamps and geo locations of the captured video content with the received information.

At 1103, it is determined if any of the captured video content stored in vehicle 101 corresponds to the received request from the government agency. The determination may be made by correlating the video content with the received request. For example, the request may include a license plate number and the processing circuitry 102 of the responder vehicle 101 or user device may search the recorded video content to determine if the license plate information was captured in the recorded video. The request may include a color and description of a vehicle of interest and the processing circuitry 102 of the responder vehicle 101 or user device may search the recorded video content to determine if a vehicle matching the description was captured in the video content. If it is determined that relevant video content is present, at 1104, to determine whether the user intends to share the video content, the user may be prompted to respond to the request through the user interface 110 located within the vehicle 101, as described above with reference to FIG. 6. In some embodiments, the user's preconfigured settings may be used to determine if the user intends to share the video content without being prompted for the same, as described above with reference to FIG. 7. The prompt may provide the user with the information of the relevant video corresponding to the request and wait for the user to provide an input approving or denying the share request. In some embodiments, the prompt may only provide the user with the date of the videos to be shared and an identification of the vehicle requesting the video content. In some embodiments, a specific timestamp of the video content to be shared may be displayed as part of the prompt. In some embodiments, a preview of the exact video to be shared may be presented on the user interface as part of the prompt. In some embodiments, a plurality of videos may be presented to the user on the user interface and the user may be able to select which of the presented videos they want to share. It is understood that numerous other iterations and formats of this prompt may be presented to the user and are all within the scope of the subject matter of this disclosure.

At 1105, it is determined if the user of the responder vehicle 101 approved the share request or denied it based on the received input from the user. If the user approves the share request, at 1106, the processing circuitry 102 of responder vehicle 101 may share the video content with the requesting party directly via vehicle-to-vehicle communication, in some embodiments. In some embodiments, the vehicle 101 may share the video content with the requesting party by uploading the video content to a cloud storage, which may then be downloaded to the requesting party from the cloud storage. In some embodiments, the user may select only a few of the relevant videos on the user interface and only the selected video content may be shared with the requesting party.

If it is determined that the user does not intend to share the video content, either via the preconfigured settings or via the user's response to the prompt, the request is denied, and no further action is taken. In some embodiments, the processing circuitry 102 of responder vehicle 101 may generate a message rejecting the request and send the message back to the requesting party either directly using vehicle-to-vehicle communication or through a cloud-based network.

Figure 12:
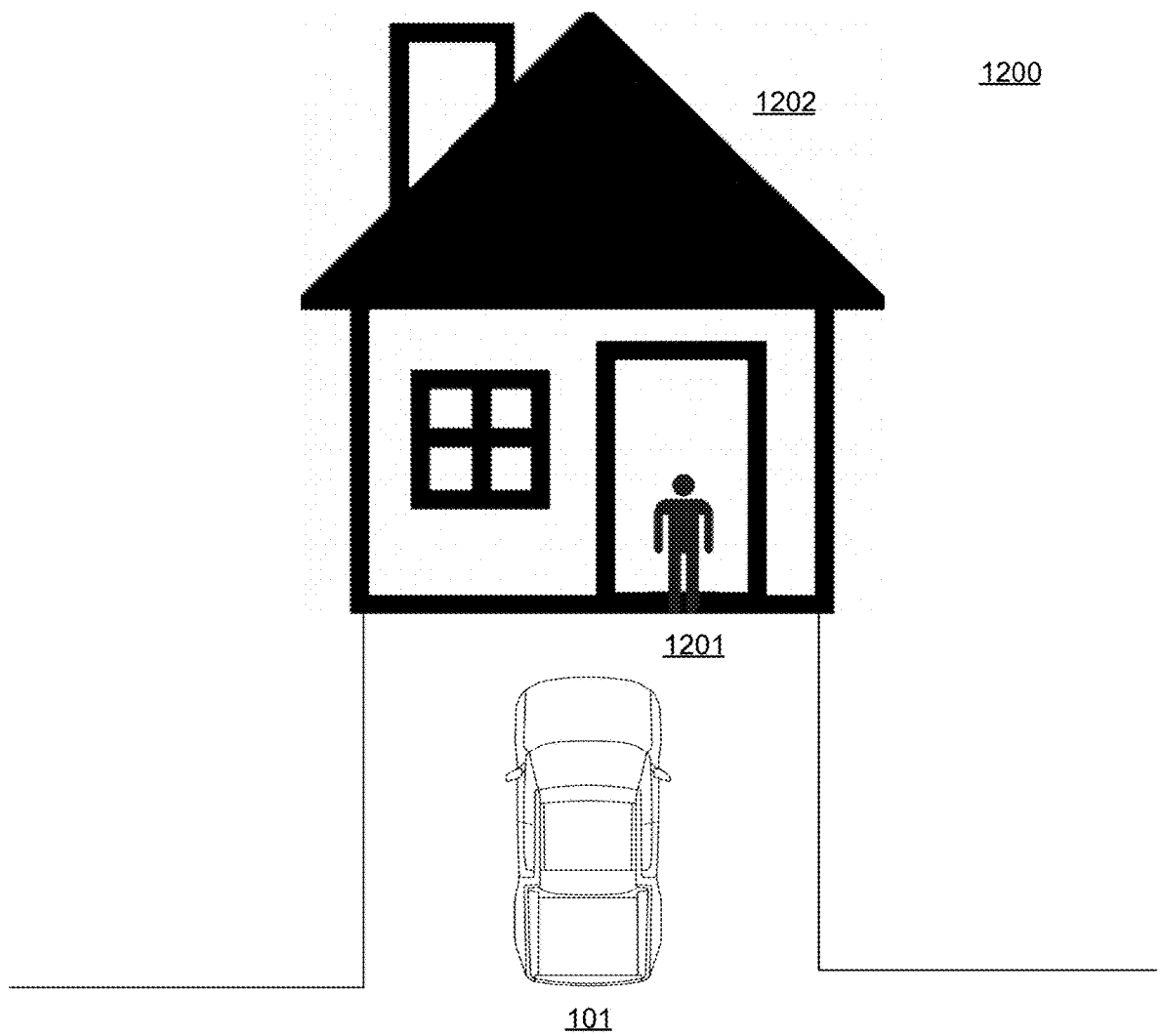
FIG. 12 shows an aerial view of a scenario in which a vehicle's recording devices work in conjunction with a home security system, in accordance with some embodiments of the present disclosure.

FIG. 12 shows an aerial view of a scenario in which a vehicle's video recording devices work in conjunction with a home security system, in accordance with some embodiments of the present disclosure. In some embodiments, the vehicle 101 may be used in conjunction with a home security system 1202 to make a recording of a security event such as a burglary event, a vandalism event, a natural weather event, and other events affecting the home. By working in conjunction with a home security system, the vehicle 101 may be able to capture and transmit useful information about a security event and help law enforcement identify a suspect. In scenario 1200, upon detecting a security event, a home security system 1202 may send a signal to the vehicle 101 to trigger the recording devices in the vehicle 101.

The processing circuitry 102 within the vehicle 101, upon receipt of the signal from the home security system 1202, may activate the cameras 122 on the vehicle 101, in accordance with some embodiments. Alternatively, the processing circuitry 102 of vehicle 101 may determine the orientation of the car in relation to the home and only activate some of the cameras 122 pointing in the direction of the home, in accordance with some embodiments. Upon activation of the cameras 122 on vehicle 101, a recording of all the activities of an acting party 1201 around the vehicle may be captured. In some embodiments, the processing circuitry 102 of vehicle 101 may transmit a message to a third party or law enforcement upon receiving the signal from the home security system 1202. In some embodiments, the processing circuitry 102 of vehicle 101 may transmit the captured video content of the acting party 1201 to a third party or law enforcement. In some embodiments, the processing circuitry 102 of vehicle 101 may receive a request from the home security system 1202 to share captured video content of the acting party 1201. The processing circuitry 102 of vehicle 101 may then, in response to the received request, transmit the captured video content of the acting party 1201 to the home security system 1202. In some embodiments, the transmission from the vehicle 101 to the home security system 1202 may be completed directly using a Bluetooth® or a Wi-Fi network. In some embodiments, the transmission from the vehicle 101 to the home security system 1202 may be completed via a cloud network 134. The acting party may be an intruder trying to break-in to the home, a human or animal vandalizing the home, an inanimate object affecting the home in a weather event, and other parties affecting the home.

Figure 13:
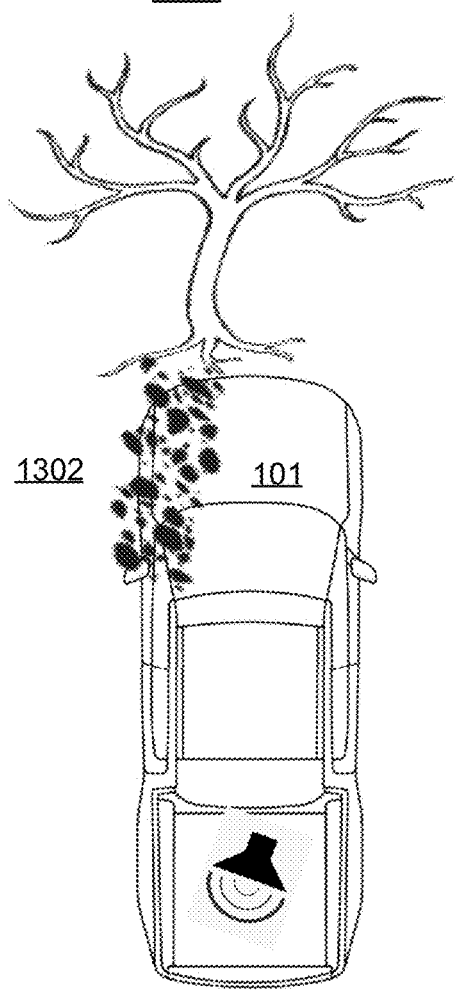
FIG. 13 shows an aerial view of a scenario in which an individual vehicle in involved in an impact event, in accordance with some embodiments of the present disclosure.

FIG. 13 shows an aerial view of a scenario in which a single vehicle is involved in an impact event, in accordance with some embodiments of the present disclosure. In some scenarios, a single vehicle may get into an accident or may break down in a deserted location. Receiving information about the condition of the car, along with other information, could be very useful under such circumstances. In scenario 1300, vehicle 101 drifted off the side of the road, which resulted in an impact event with a tree. As shown, vehicle 101 suffers damage to the left front quadrant of the vehicle. Upon detecting such an impact event, the processing circuitry 102 of vehicle 101 may collect useful information and present the information to the users of the vehicle.

In some embodiments, the user may be provided with a context menu on a user interface 110 located within the vehicle 101, where the users of the vehicle 101 can provide input to obtain useful information following an impact event. The various embodiments of the information that may be displayed on the user interface 110 are further described in more detail with reference to FIGS. 14 and 15.

Figure 14:
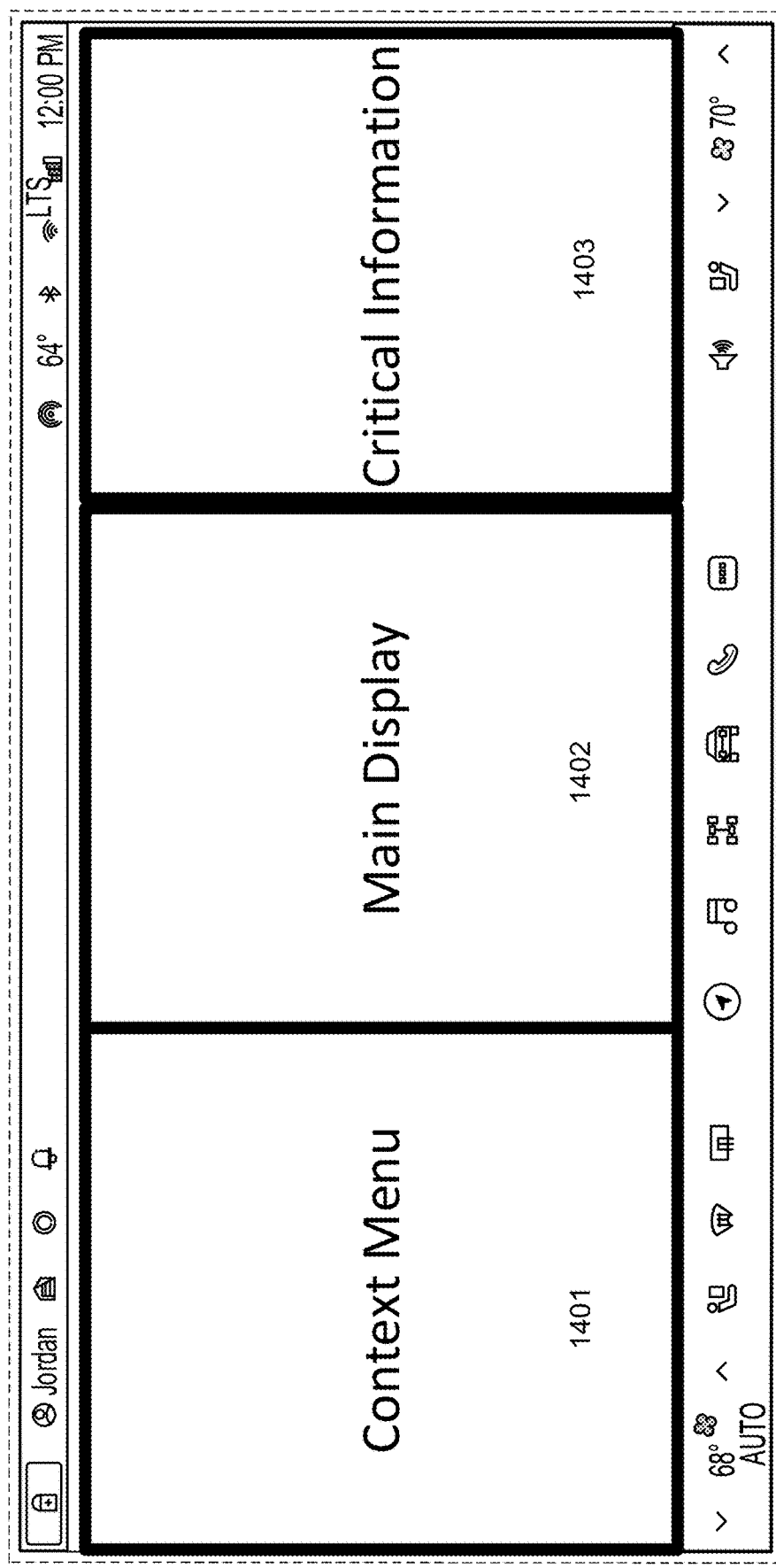
FIG. 14 shows a user interface depicted on a display inside a vehicle incorporating a context menu, following an impact event, in accordance with some embodiments of the present disclosure.

FIG. 14 shows a user interface depicted on a display inside a vehicle incorporating a context menu, following an impact event, in accordance with some embodiments of the present disclosure. In some embodiments, following an impact event, the processing circuitry 102 of vehicle 101 may generate a context menu 1401 to be displayed on the user interface 110 located inside the vehicle 101. The context menu 1401 may be generated using contextual parameters, which may include information regarding the condition of the vehicle 101 as a whole, and the condition of the portions of the vehicle 101 affected by the impact event, in accordance with some embodiments. Other contextual parameters relating to the geographical area and conditions of the area surrounding the impact event may be used to generate the context menu 1401. For example, the weather in the area where the impact event occurred may be considered relevant and appropriate points of interest may be provided to the user as may be useful in light of the weather conditions. Additional warning messages may also be helpful in light of weather conditions in the area where the impact event occurred, and such warning messages may be added to the context menu 1401 (e.g., in extreme cold weather, a risk of frost bite may be prevalent and a warning to that effect may be helpful to the user). The user interface 110 may be divided into three portions incorporating a context menu 1401, a main display 1402, and a useful information section 1403.

Based on the selection made by the users of the vehicle 101 in the context menu 1401, the contents in the main display 1402 and the useful information section 1403 may change, in accordance with some embodiments. In accordance with some embodiments, the contents in the useful information section 1403 remain fixed irrespective of the selections made by the users of the vehicle 101 on the context menu 1401. Alternatively, the main display 1402 may continuously display an image of the vehicle depicting the damage irrespective of the selections being made by the users of the vehicle 101.

A user interface 110 generated following an impact event of scenario 1300 is described hereinbelow, with reference to FIG. 15.

Figure 15:
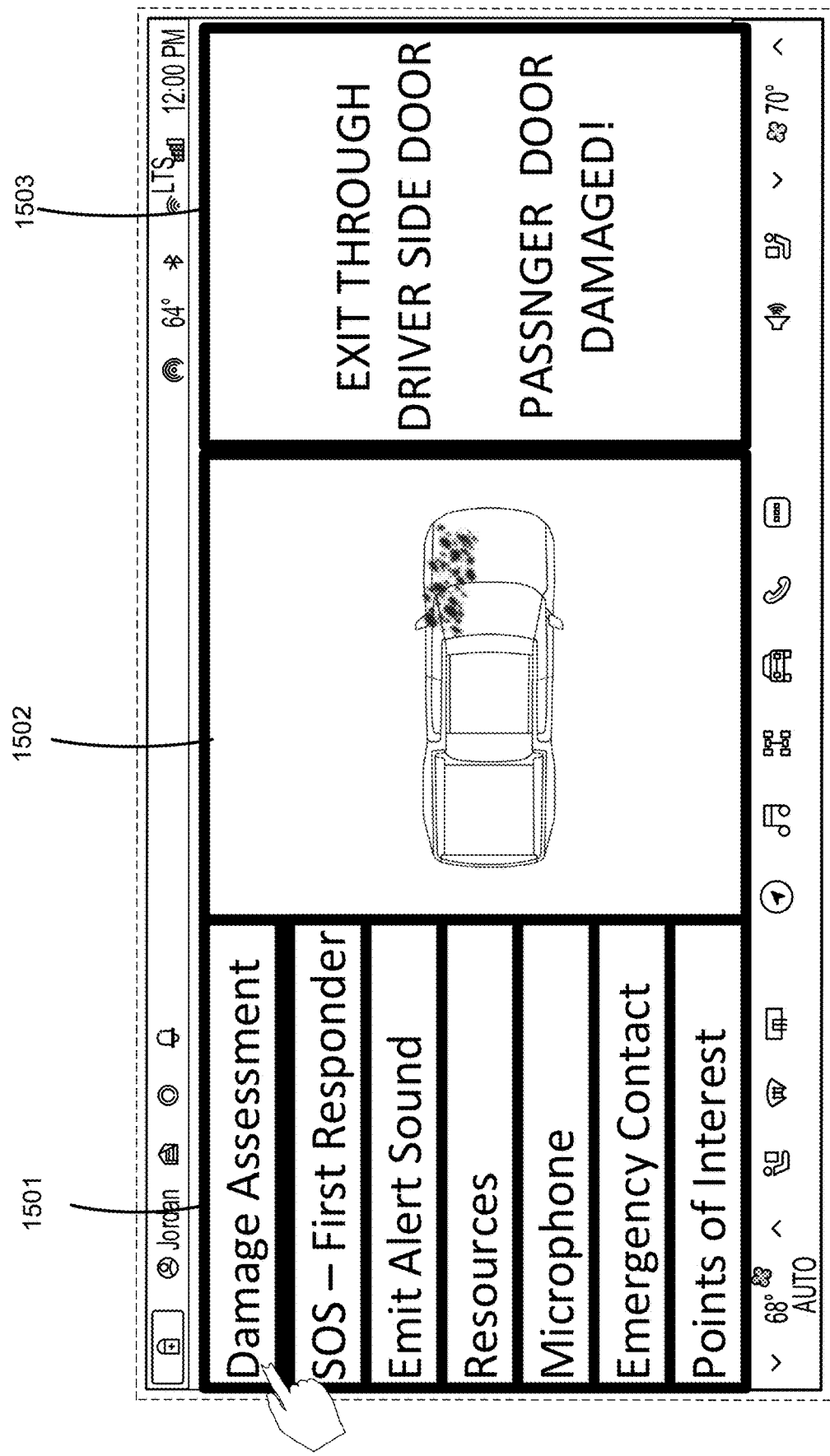
FIG. 15 shows a user interface depicted on a display inside a vehicle incorporating a context menu, following an impact event, in accordance with some embodiments of the present disclosure.

FIG. 15 shows a user interface depicted on a display inside a vehicle incorporating a context menu, following an impact event, in accordance with some embodiments of the present disclosure. Upon detection of the impact event in scenario 1300, the processing circuitry 102 of vehicle 101 generates a user interface comprising of a context menu 1501, a main display 1502 and a useful information section 1503, in accordance with some embodiments. The processing circuitry 102 gathers useful information from one or more parts of the vehicle to determine the areas damaged by the impact event and displays a representation of the damaged vehicle 101 on the main display 1502.

The processing circuitry 102 then generates the context menu 1501 based on contextual parameters which may incorporate information regarding the condition of the portions of the vehicle 101 affected by the impact event as well as predetermined information. In the impact event depicted in scenario 1300, the processing circuitry 102 may determine that the front left quadrant of the vehicle 101 has been damaged. Accordingly, a representation of that damage may be displayed in the main display 1502. In accordance with some embodiments, the context menu 1501 generated by the processing circuitry 102 incorporates an option to display damage assessment. In some embodiments, the list of options displayed may include damage assessment, SOS— first responder, emit alert sound, resources, microphone, emergency contact, and points of interest. The list of options provided herein is illustrative only and more or less options may be provided to the user based on the impact event and other aspects. When a user of the vehicle 101 selects the damage assessment menu option, the useful information section 1503 may display important information about the damage to the vehicle 101. As in scenario 1300, upon selection of damage assessment, the useful information section 1503 warns the user not to use the driver side door and exit through the passenger side door in light of the damage to the top left quadrant of the vehicle 101.

In some embodiments, another menu option in the context menu 1501 may be an SOS call option to first responders. By selecting this option, the users of the vehicle 101 may be able to reach out to first responders directly through the vehicle 101 and the vehicle 101 may additionally share its location with first responders as well, in accordance with some embodiments. This option may eliminate the need for an injured user of the vehicle 101 to try and find their mobile phone following an impact event.

In some embodiments, a menu option on the context menu 1501 may be an option to emit alert sounds outside the vehicle. In some embodiments, by selecting this option, the users of the vehicle 101 can activate speakers located outside the vehicle to emit a loud sound in order to help alert anyone in the vicinity of the impact event. Having an option to emit such a loud sound may help if the impact event occurred in a remote area or if the vehicle 101 is off the road because of the impact event. In some embodiments, a menu option on the context menu 1401 may be a resources button which may provide the user with helpful information to either fix the damage to the vehicle or direct the user to a first aid kit, in accordance with some embodiments.

In some embodiments, a menu option on the context menu 1501 may be a microphone. By selecting this option, the user may be able to use the microphones located inside the vehicle 101 to speak with people using the speakers located outside the vehicle 101, in accordance with some embodiments. In some embodiments, a menu option on the context menu 1501 may be an emergency contact option. By selecting this option, the user may be able to dial a pre-saved emergency contact in the vehicle's database.

In some embodiments, a menu option on the context menu 1501 may be points of interest, which may provide the user with a dynamic set of locations or businesses nearby the vehicle 101 based on the kind of impact event the vehicle 101 was involved in and the damage to the vehicle 101. In some embodiments, if the vehicle's 101 tire has been punctured, the points of interest may include a tire mechanic's workshop nearby to help the user take appropriate action. In some embodiments, the points of interest may include the closest AAA location and the nearest gas station location. Upon selection of this menu option, the list of points of interest may be displayed on the main display 1502 or the useful information section 1503. Although an embodiment of context menu 1501 is described herein with reference to FIG. 15, the number and type of menu options that may be displayed to the user in the content menu 1501 may be different from what is shown in FIG. 15 and all such options are within the subject matter of this disclosure.

Figure 16:
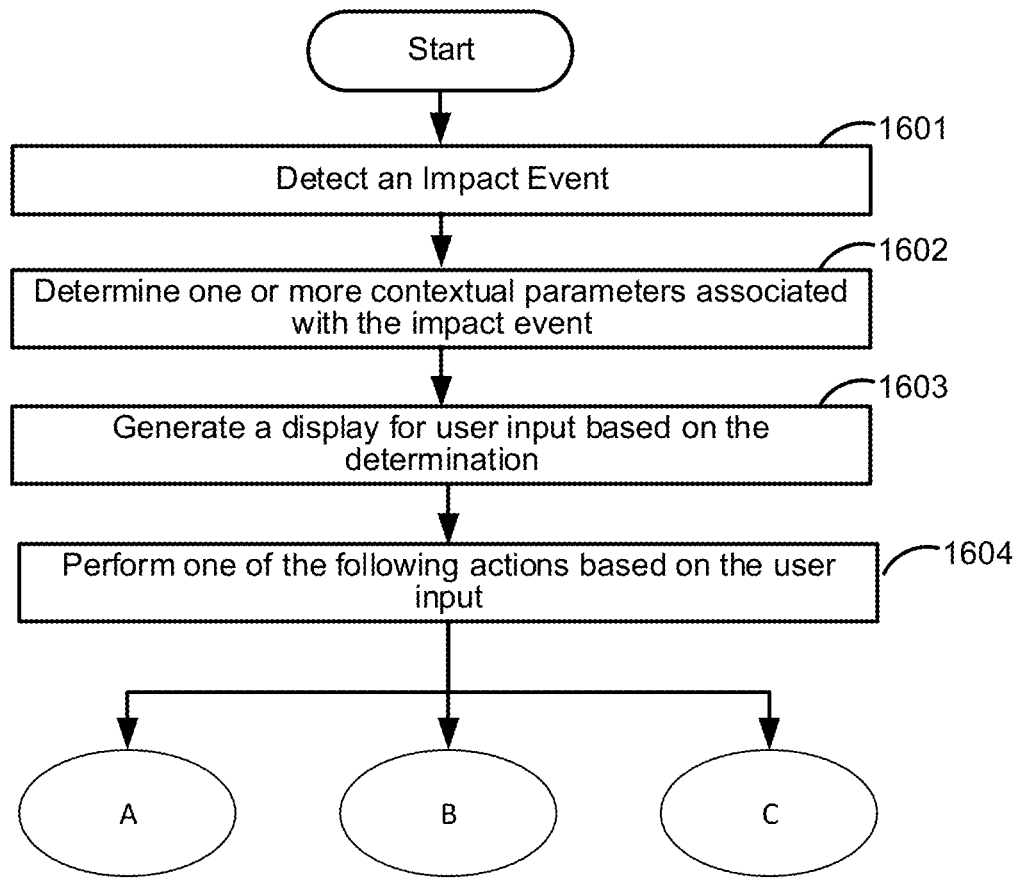
FIG. 16 shows a flowchart of an illustrative process for displaying a context menu to users of a vehicle involved in an impact event, in accordance with some embodiments of the present disclosure.

FIG. 16 shows a flowchart of an illustrative process for displaying a context menu to users of a vehicle involved in an impact event, in accordance with some embodiments of the present disclosure. In some embodiments, process 1600 is executed by processing circuitry 102 of the vehicle 101. In some embodiments, the process 1600 is executed by processing circuitry of a user device supporting an application related to the vehicle. At 1601, the processing circuitry 102 of vehicle 101 detects that the vehicle 101 has been in an impact event. This determination of an impact event may be made by the processing circuitry 102 receiving information from the sensor interface 112.

At 1602, the processing circuitry 102 of vehicle 101 determines one or more contextual parameters associated with the impact event. In some embodiments, these parameters may incorporate information relating to the damage occurred to the different portions of the vehicle 101 in the impact event. In some embodiments, these parameters may incorporate the time, location, weather conditions, and vicinity to helpful resources in relation to the impact event. While some contextual parameters are listed herein, it is specifically understood that the scope of this disclosure is not listed thereto, and other contextual parameters may be used. Once the processing circuitry 102 determined the one or more contextual parameters, at 1603, it generates a context menu 1401 to be displayed on the user interface 110 located inside the vehicle 101. The context menu 1401 may be generated using the contextual parameters, by obtaining information about the condition of the portions of the vehicle 101 potentially affected by the impact event as well as predetermined information, in accordance with some embodiments. The user interface 110 may be divided into three portions incorporating a context menu 1401, a main display 1402, and a useful information section 1403, as described in detail above with reference to FIG. 14.

Based on the selection made by the users of the vehicle 101 on the context menu 1401, at 1604, respective actions are performed by the processing circuitry 102 of the vehicle 101, as described hereinbelow, with reference to FIG. 17.

Figure 17:
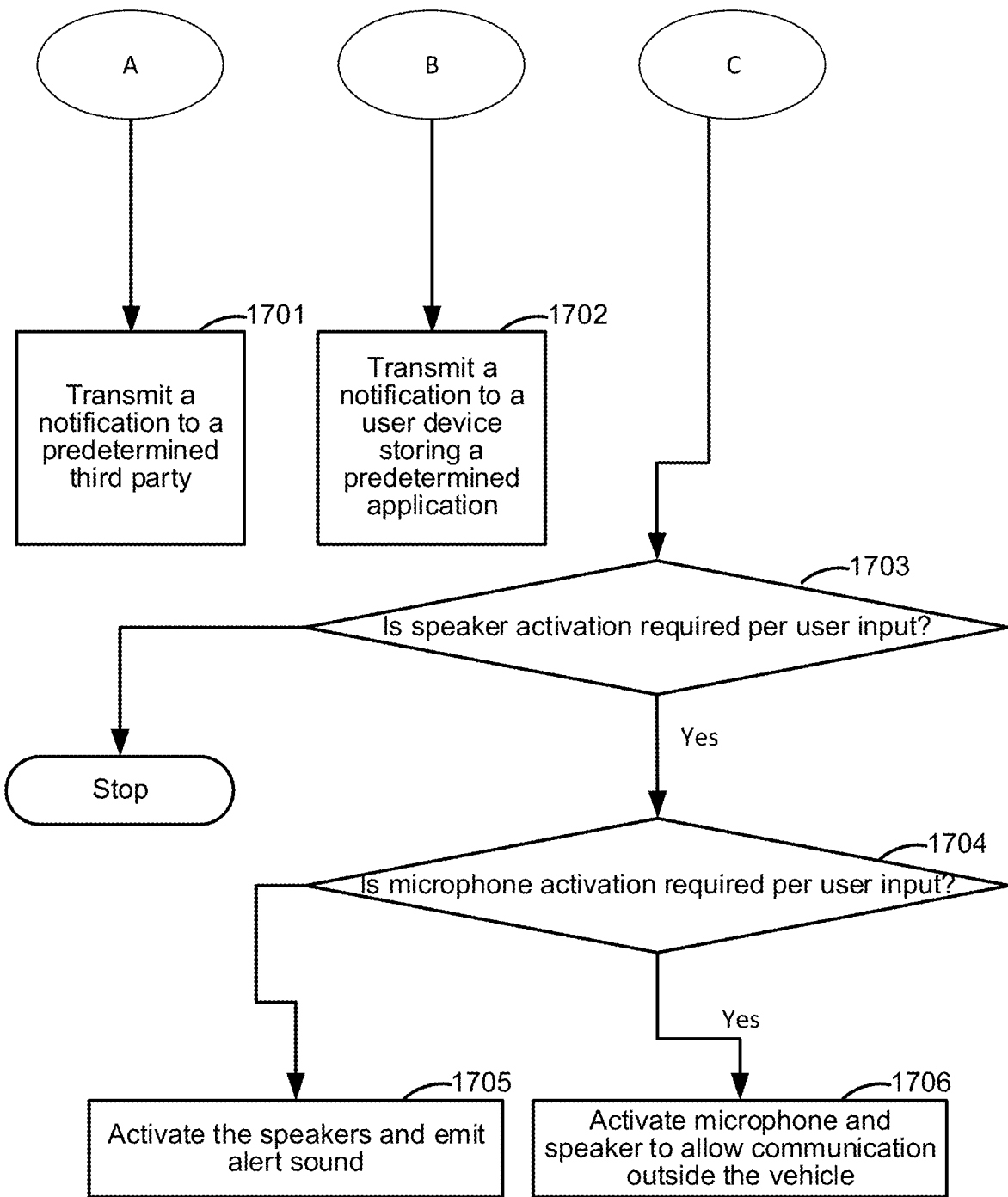
FIG. 17 is a continuation of the flowchart in FIG. 16 and shows an illustrative process for displaying a context menu to users of a vehicle involved in an impact event, in accordance with some embodiments of the present disclosure.

FIG. 17 is a continuation of the flowchart in FIG. 16 and shows an illustrative process for displaying a context menu 1401 to users of a vehicle involved in an impact event, in accordance with some embodiments of the present disclosure. Based on the received input from the user on the context menu 1401, the processing circuitry 102 performs the respective action associated with the selection. In some embodiments, upon receiving a first selection from the user on the context menu 1501, at 1701, the processing circuitry 102 of vehicle 101 transmits a notification about the impact event to a predetermined third party. The third party may be an emergency contact who is a family or friend of the user of the vehicle 101 and the user may contact them by selecting the "Emergency Contact" menu option from the context menu 1501, in some embodiments. The third party may be first responders and the user may contact them by selecting the "SOS—First Responder" menu option from the context menu 1501, in some embodiments. The notification may be transmitted by the vehicle 101 using vehicle-to-vehicle communication. The notification may be transmitted by the vehicle 101 by uploading the notification to a remote server 138 which may then be pushed to a third party. The notification may be sent via an ISP using a 5G network.

In some embodiments, upon receiving a second selection from the user on the context menu 1501, at 1702, the processing circuitry 102 of vehicle 101 transmits a notification about the impact event to a user device storing a predetermined application. This user device may include all user devices that have the application relating to the vehicle 101 downloaded on it and signed into the user's account, in accordance with some embodiments and the user may transmit the notification to all such user devices by selecting the "Resources" menu option from the context menu 1501. For example, if the user and the user's spouse both have an application relating to the vehicle 101 downloaded on their mobile device and are both signed into their accounts, upon making this second selection, the processing circuitry 102 of the vehicle 101 may transmit a notification about the impact event to both the user and the user's spouse's mobile device, in accordance with some embodiments. This may be achieved by uploading the notification to a remote server 138 which may then be pushed to a third party mobile device where the vehicle applications have been downloaded, and push notifications have been appropriately activated. The notification may then be pushed to the user and user's spouse based on their phone setting, in accordance with some embodiments.

In some embodiments, upon receiving a third selection from the user on the context menu 1501, at 1703, the processing circuitry 102 of vehicle 101 determines if the selection made by the user includes activation of the speaker. If it is determined that the speakers need to be activated, based on the user's selection of the "Emit Alert Sound" menu option from the context menu 1501, at 1704, the processing circuitry 102 of vehicle 101 determines if the selection made by the user includes activation of the microphone. If it is determined that the microphone activation is also requested by the user, at 1706, based on the user's selection of the "Microphone" menu option from the context menu 1501, both the speakers and the microphones are activated so that the user may use the microphone located inside the vehicle to communicate and the user's voice is emitted through the speakers located on the outside of the vehicle 101, in accordance with some embodiments. If it is determined that the user only selected the speakers to be activated, based on the user only selecting the "Emit Alert Sound" menu option from the context menu 1501, at 1705, the processing circuitry 102 of the vehicle 101 activates the speakers located outside the vehicle and emits an alert sound to attract attention to the site of the impact event, in accordance with some embodiments.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   detecting an impact event associated with a vehicle;
   determining, using the vehicle, a location on the vehicle of the impact event or a direction of the impact event on the vehicle;
   determining, using the vehicle, an area of interest based on the location or the direction;
   transmitting, from the vehicle, a request to at least one video recording device within the area of interest; and
   receiving, from the at least one video recording device, video content captured within a time period around the impact event.

2. The method of claim 1, wherein the at least one video recording device comprises a plurality of vehicles.

3. The method of claim 1,
   wherein the area of interest is a section of a region surrounding the vehicle.

4. The method of claim 1, wherein the request comprises the area of interest.

5. The method of claim 1, wherein the request comprises a location of the vehicle and a time of the impact event.

6. The method of claim 1, wherein receiving the video content comprises downloading the video content at the vehicle from cloud storage.

7. The method of claim 1, wherein the at least one video recording device comprises a nearby vehicle and wherein receiving the video content comprises receiving the video content from the nearby vehicle using vehicle-to-vehicle communication.

8. The method of claim 1, wherein the request causes a message prompt to appear on the at least one video recording device.

9. The method of claim 1, wherein the area of interest is determined based on the location.

10. The method of claim 1, wherein the direction comprises at least one of a direction of travel of the vehicle or a direction of travel of another vehicle associated with the impact event.

11. A method, comprising:
    receiving, at a vehicle, an input to configure a video content sharing setting of the vehicle;
    receiving, at the vehicle, a request to share video content captured by the vehicle with a remote device;
    determining, at the vehicle, whether to respond to the request based on the video content sharing setting; and
    in response to determining to respond to the request, transmitting the video content to the remote device.

12. The method of claim 11, further comprising:
    in response to receiving the input and the request, generating a message on a display of the vehicle prompting a user to respond to the request, wherein:
    determining whether to respond to the request is further based on a response to the message.

13. The method of claim 12, wherein the message comprises a list of videos that the user can select for the transmitting.

14. The method of claim 11, wherein:
    the request to share video content comprises an identification of the remote device; and
    determining whether to respond to the request is further based on the identification of the remote device.

15. The method of claim 11, wherein the remote device comprises a nearby vehicle and wherein transmitting the video content comprises transmitting the video content to the nearby vehicle using vehicle-to-vehicle communication.

16. The method of claim 11, wherein transmitting the video content comprises uploading the video content to cloud storage.

17. The method of claim 11, wherein the request to share video content is an amber alert; and
    wherein the determining further comprises determining, at the vehicle, whether video content captured by the vehicle corresponds to the amber alert.

18. The method of claim 11, wherein the remote device comprises a security system.

19. The method of claim 11, wherein:
    the input further specifies an identification of the remote device to receive the video content; and
    the method further comprises configuring, based on the input, the video content sharing setting to automatically share the video content with the remote device without generating a message prompting a response to the request.

20. A system, comprising:
    one or more sensors of a vehicle configured to detect an impact event; and
    processing circuitry configured to:
    determine an occurrence of an impact event associated with the vehicle based on the one or more sensors;
    determine a location on the vehicle of the impact event or a direction of the impact event on the vehicle;
    determine an area of interest based on the location or the direction;
    transmit, from the vehicle, a request to at least one video recording device within the area of interest; and
    receive, from the at least one video recording device, video content captured within a time period around the impact event.

* * * * *